(12) United States Patent
Schroeder et al.

(10) Patent No.: US 9,575,177 B2
(45) Date of Patent: *Feb. 21, 2017

(54) APPARATUS AND METHOD FOR USING RADAR TO EVALUATE WIND FLOW FIELDS FOR WIND ENERGY APPLICATIONS

(71) Applicant: Texas Tech University System, Lubbock, TX (US)

(72) Inventors: John Schroeder, Lubbock, TX (US); Brian Hirth, Lubbock, TX (US); Jerry Guynes, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 521 days.

This patent is subject to a terminal disclaimer.

(21) Appl. No.: 13/952,611

(22) Filed: Jul. 27, 2013

(65) Prior Publication Data

US 2014/0028496 A1 Jan. 30, 2014

Related U.S. Application Data

(60) Provisional application No. 61/676,394, filed on Jul. 27, 2012, provisional application No. 61/683,022, filed on Aug. 14, 2012.

(51) Int. Cl.
*G01S 13/95* (2006.01)
*G01P 5/00* (2006.01)
(Continued)

(52) U.S. Cl.
CPC .............. *G01S 13/95* (2013.01); *G01P 5/001* (2013.01); *G01S 13/589* (2013.01); *G01S 13/87* (2013.01);
(Continued)

(58) Field of Classification Search
CPC ........ G01P 5/001; G01S 13/95; G01S 13/589; G01S 13/87; G01S 13/951; G01S 13/956
(Continued)

(56) References Cited

U.S. PATENT DOCUMENTS 4,649,388 A * 3/1987 Atlas ..................... G01S 13/951
342/26 D
5,523,759 A 6/1996 Gillberg et al.
(Continued)

FOREIGN PATENT DOCUMENTS

WO 2009144435 A1 12/2009
WO 2011160634 A1 12/2011

OTHER PUBLICATIONS

International Search Report (KIPO) PCT/US2013/052435 dated Nov. 21, 2013.
(Continued)

*Primary Examiner* — Timothy A Brainard
(74) *Attorney, Agent, or Firm* — Daniel J. Chalker; Edwin S. Flores; Chalker Flores, LLP

(57) ABSTRACT

The present invention provides an apparatus and method for obtaining data to determine one or more characteristics of a wind flow field using one or more radars. Data is collected from the one or more radars, and analyzed to determine the one or more characteristics of the wind flow field. The one or more radars are positioned to have a portion of the wind flow field within a scanning sector of the one or more radars.

34 Claims, 28 Drawing Sheets

(51) Int. Cl.
G01S 13/87 (2006.01)
G01S 13/58 (2006.01)
(52) U.S. Cl.
CPC .......... *G01S 13/951* (2013.01); *G01S 13/956* (2013.01); *F03D 17/00* (2016.05); *F05B 2270/32* (2013.01); *F05B 2270/321* (2013.01)
(58) Field of Classification Search
USPC ...................................................... 342/26 R
See application file for complete search history.

(56) References Cited

U.S. PATENT DOCUMENTS

| | | | | |
|---|---|---|---|---|
| 2001/0013839 | A1* | 8/2001 | Wurman | G01S 13/003 342/26 R |
| 2002/0024652 | A1 | 2/2002 | Ooga | |
| 2006/0202886 | A1* | 9/2006 | Mahapatra | G01S 7/12 342/176 |
| 2010/0079330 | A1* | 4/2010 | Venkatachalam | G01S 7/003 342/59 |
| 2010/0117892 | A1 | 5/2010 | Barbaresco | |
| 2010/0187828 | A1 | 7/2010 | Reidy | |
| 2010/0265120 | A1 | 10/2010 | Drake et al. | |
| 2011/0241926 | A1 | 10/2011 | Laufer | |
| 2011/0241928 | A1* | 10/2011 | Oswald | G01S 13/42 342/90 |
| 2011/0260908 | A1 | 10/2011 | New et al. | |
| 2012/0179376 | A1 | 7/2012 | O'Brien et al. | |
| 2012/0303278 | A1 | 11/2012 | Dannevik | |

OTHER PUBLICATIONS

International search Report and Written Opinion (KIPO) PCT/US2013/052434 dated Dec. 16, 2013.
Barthelmie, R. J., et al., "Modelling and Measurements of Power Losses and Turbulence Intensity in Wind Turbine Wakes at Middelgruden Offshore Wind Farm," Wind Energy Jul. 16, 2007 10:517-528.
Barthelmie, R. J., et al., "Quantifying the impact of wind turbine wakes on power output and offshore wind farms," J. Atmos. Oceanic Technol., Aug. 2010 27:1302-1317.
Chowdhury, S., et al., "Unrestricted wind farm layout optimization (UWFLO): Investigating key factors influencing the maximum power generation," Renewable Energy Feb. 2012 38:16-30.
España, Get al., "Spatial study of the wake meandering using modelled wind turbines in a wind tunnel," Wind Energy Oct. 2011 14:923-937.
Grund, C. J., et al., "High-resolution Doppler lidar for boundary layer and cloud research," J. Atmos. Oceanic Technol., Mar. 2001 18:376-393.
Hirth, Brian D., et al., "Measuring a Utility-Scale Turbine Wake Using the TTUKa Mobile Research Radars," J. Atmos. Oceanic Technol. Jun. 2012 29:765-771.
Hirth, Brian D., et al., "Documenting Wind Speed and Power Deficits behind a Utility-Scale Wind Turbine," J. Appl. Meteor. Climatol., 2013 52:39-46.
Kasler, Y., et al., "Wake measurements of a multi-MW wind turbine with coherent long range pulsed Doppler wind lidar" J. Atmos. Oceanic Technol. Sep. 2010 27:1529-1532.
Khanna, S., et al., "Three-dimensional buoyancy-and shear-induced local structure of the atmospheric boundary layer," J. Atmos. Sci. Mar. 1, 1998 55:710-741.
Knudsen, T., et al., "Prediction models for wind speed at turbine locations in a wind farm," Wind Energy Aug. 8, 2011 14, 877-894.
Kusiak, A., et al., "Design of wind farm layout for maximum wind energy capture," Renewable Energy Mar. 2010 35:685-694.
Larsen, G. C., et al., "Wake meandering—a pragmatic approach," Wind Energy Jul./Aug. 2008 11:4 377-395.
Meyers, J., et al., "Optimal turbine spacing in fully developed wind-farm boundary layers," Wind Energy Mar. 2012 15:305-317.
Newsom, Rob K., et al., "Retrieval of Microscale Wind and Temperature Fields from Single- and Dual-Doppler Lidar Data," J. Applied Meteorol. Sep. 2005 44:1324-1345.
O'Hora, F., et al., "Improving weather radar observations using pulse-compression techniques," Meteorol. Appl. 2007 14:389-401.
Sanderse, B., et al., "Review of computational fluid dynamics for wind turbine wake aerodynamics," Wind Energy Oct. 2011 14:799-819.
Vermeer, N. J., et al., "Wind turbine wake aerodynamics," Prog. Aerosp. Sci., Nov. 2003 39:467-510.
Weiss, C. C., et al., "The TTUKa mobile Doppler radar: Coordinated radar and in situ measurements of supercell thunderstorms during Project VORTEX2," Proc. 34th Conf. on Radar Meteorology, Williamsburg, VA, Amer.Meteor. Soc. 11B.2 2009.
Hirth, Brian D., et al., "Coupling Doppler Radar-Derived Wind Maps with Operational Turbine Data to Document Wind Farm Complex Flows," Wind Energy, submitted 2013.
Larsen, G. C., et al., "Dynamic wake meandering modeling," 2007 Risø Rep. 83 pp.
Wharton, S., et al., "Assessing atmospheric stability and its impacts on rotor-disk wind characteristics at an onshore wind farm," Wind Energy, May 2013 15: 525-546.
Barthelmie, R. J., et al., "Modelling and measuring flow and wind turbine wakes in large wind farms offshore," Wind Energy, Jul. 2009 12, 431-444.
Barthelmie, R. J., et al., "Evaluation of wind farm efficiency and wind turbine wakes at the Nysted offshore wind farm," Wind Energy, Sep. 2010 13, 573-586.
Bingöl, F., et al., "Light detection and ranging measurement of wake dynamics part 1: one-dimensional scanning," Wind Energy Jan. 2010 13, 51-61.
Crespo, A., et al., "Survey of modeling methods for wind turbine wakes and wind farms," Wind Energy Jan. 1999 2, 1-24.
Farnett, E. C., et al., "Pulse Compression Radar" Radar Handbook, M. I. Skolnik (McGraw-Hill, New York, 1990), chap 10.
Gonzalez, J. S., et al., "Optimization of wind farm turbines layout using an evolutive algorithm," Renewable Energy Aug. 2010 35, 1671-1681.
Troldborg, N., et al., "Numerical simulations of wake interaction between two wind turbines at various inflow conditions," Wind Energy Oct. 2011 14, 859-876.
Trujillo, J., et al., "Light detection and ranging measurement of wake dynamics part 2: two-dimensional scanning," Wind Energy Jan. 2011 14, 61-75.
Young, G. S., et al., "Rolls, Streets, Waves and More: A review of Quasi-Two-Dimensional Structures in the Atmosheric Boundry Layer," Bull. Am. Meteorol. Soc. Jul. 2002 83, 997-1001.
Brian D. Hirth et al: "Measuring a Utility-Scale Turbine Wake Using the TTUKa Mobile Research Radars", Journal of Atmospheric and Oceanic Technology, vol. 29, No. 6, Jun. 1, 2012 (Jun. 1, 2012), pp. 765-771, XP055183291, ISSN: 0739-0572, DOI: 10.1175/JTECH-D-12-00039.1.
EP 13822416.7 Extended Search Report dated Jan. 8, 2016.
U.S. Appl. No. 13/952,606, Office Action, dated Nov. 6, 2015.

* cited by examiner

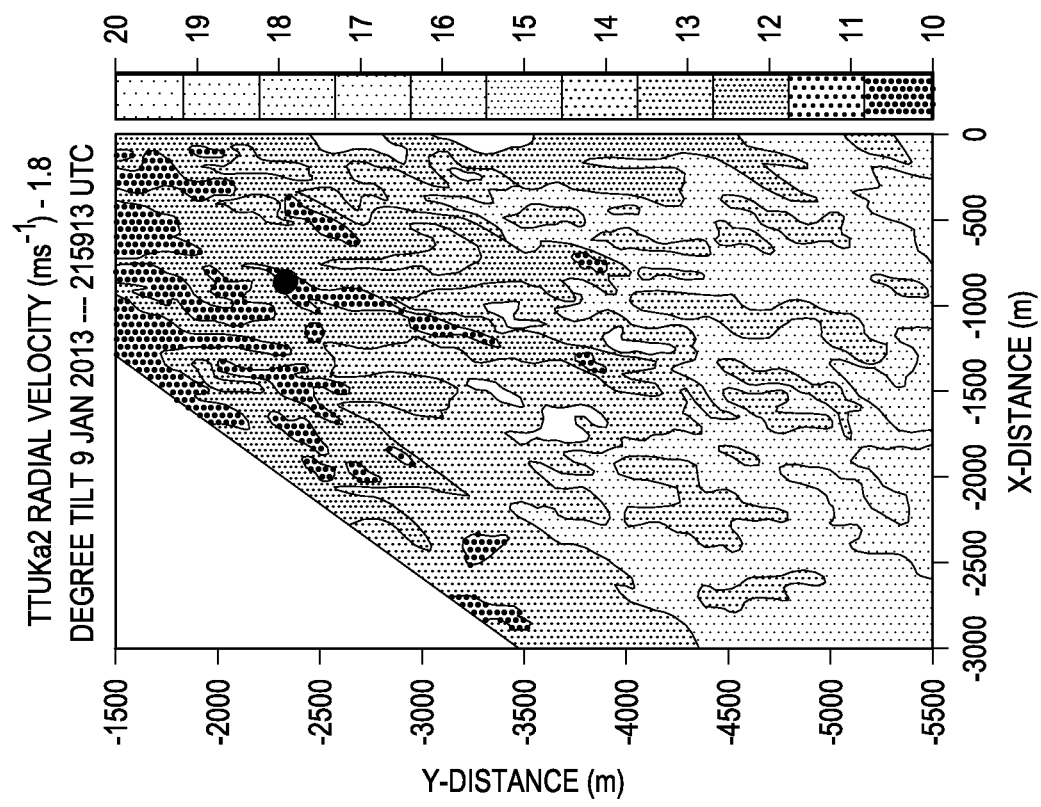

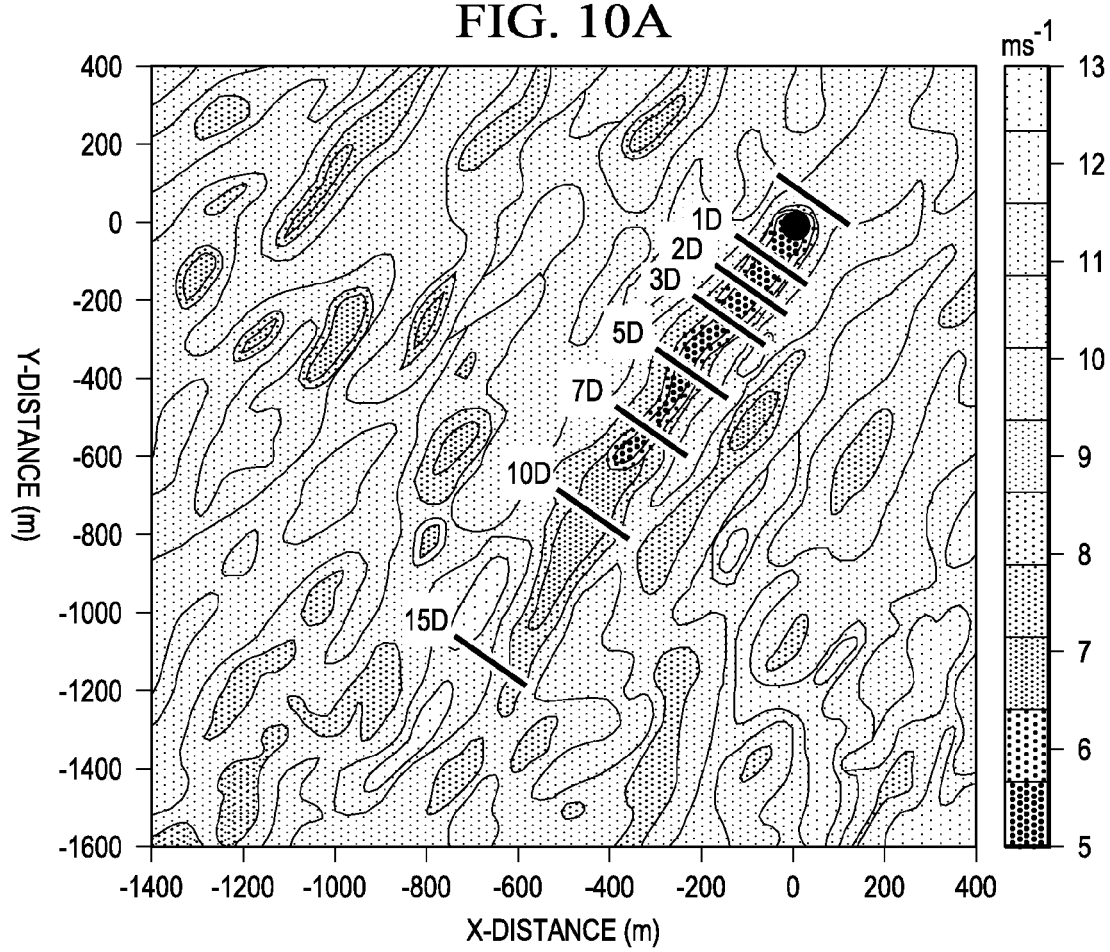

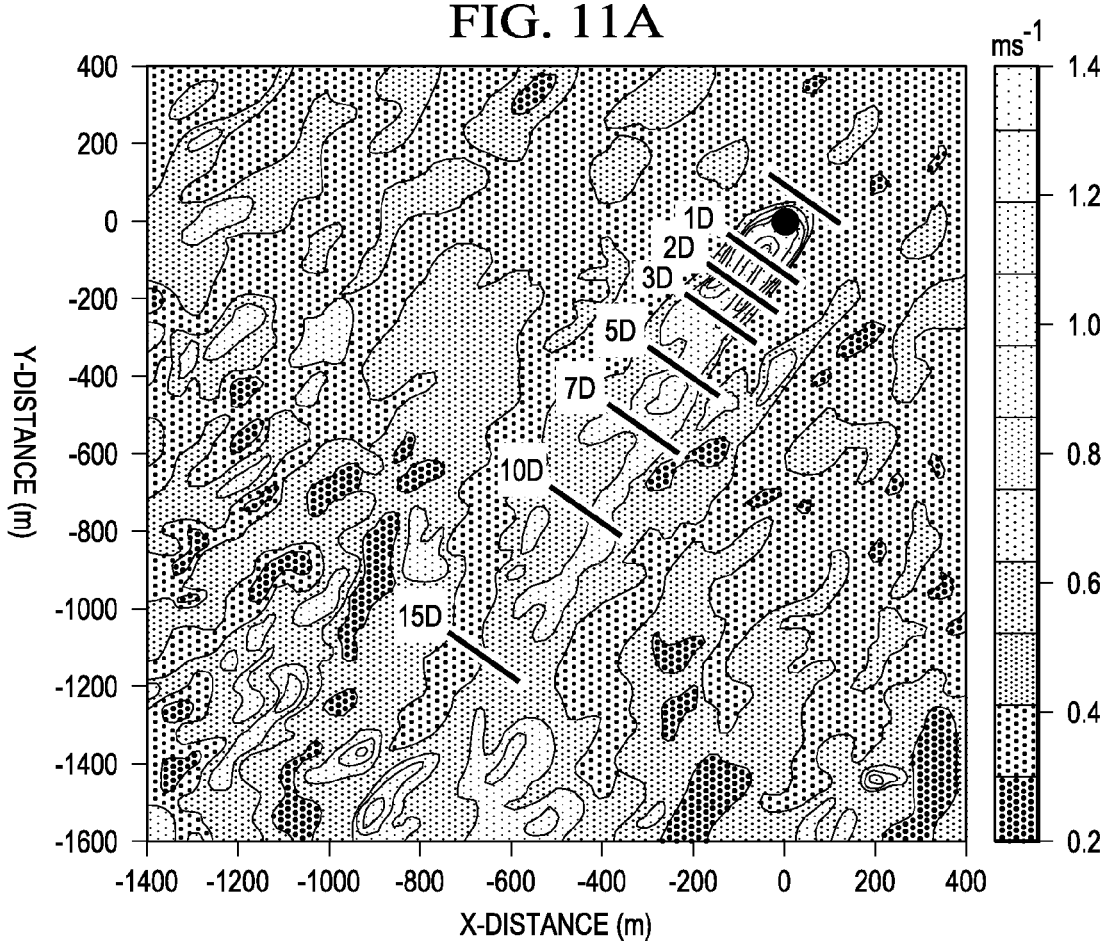

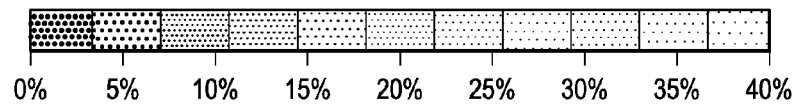
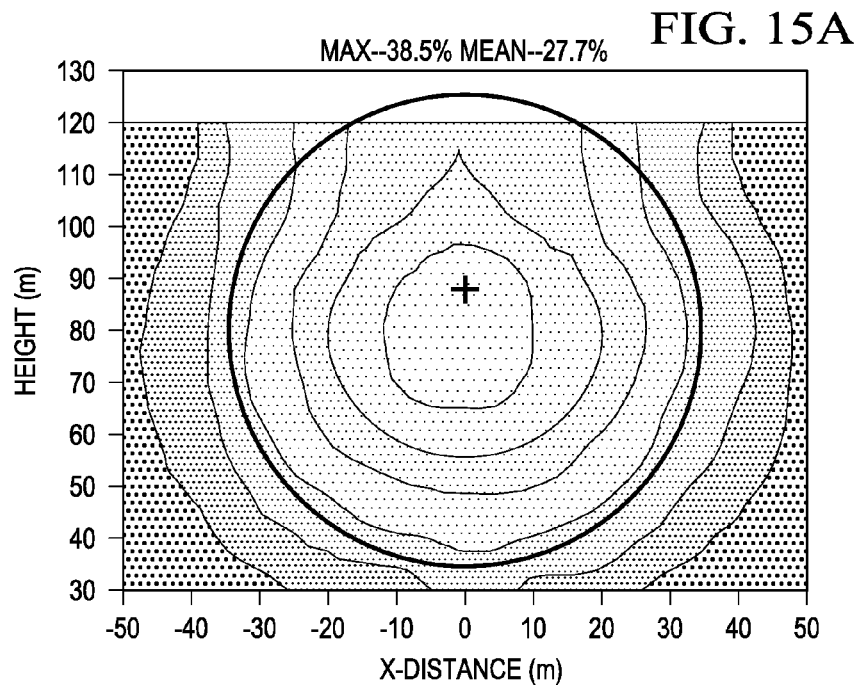
FIG. 15A
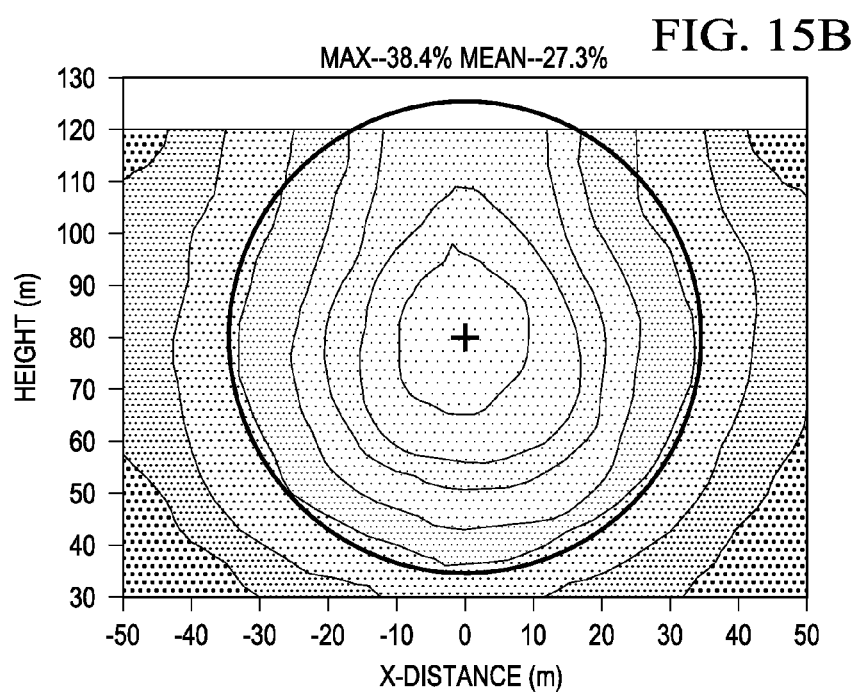
FIG. 15B

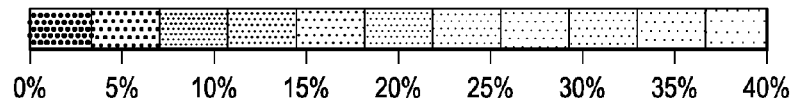
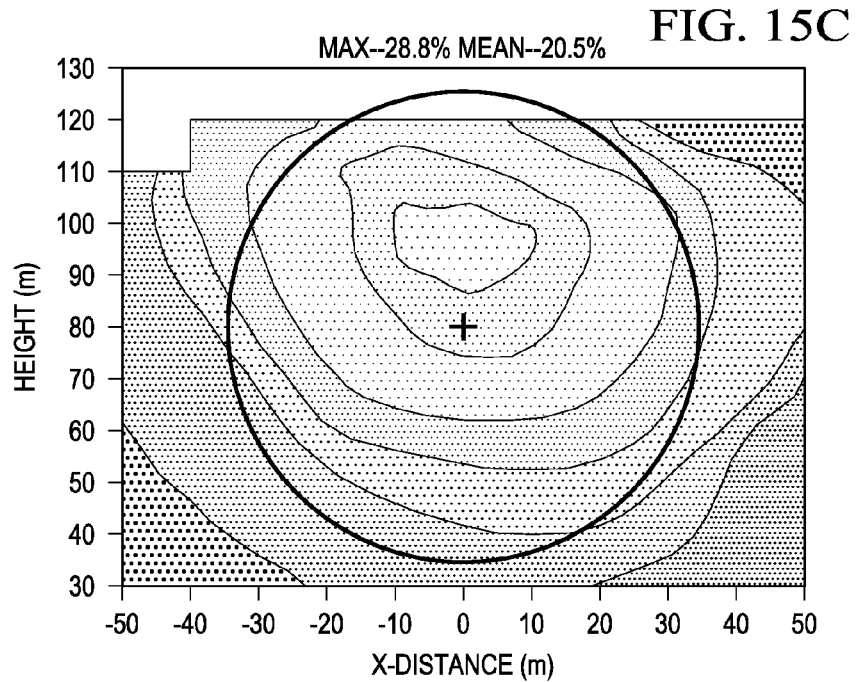
FIG. 15C
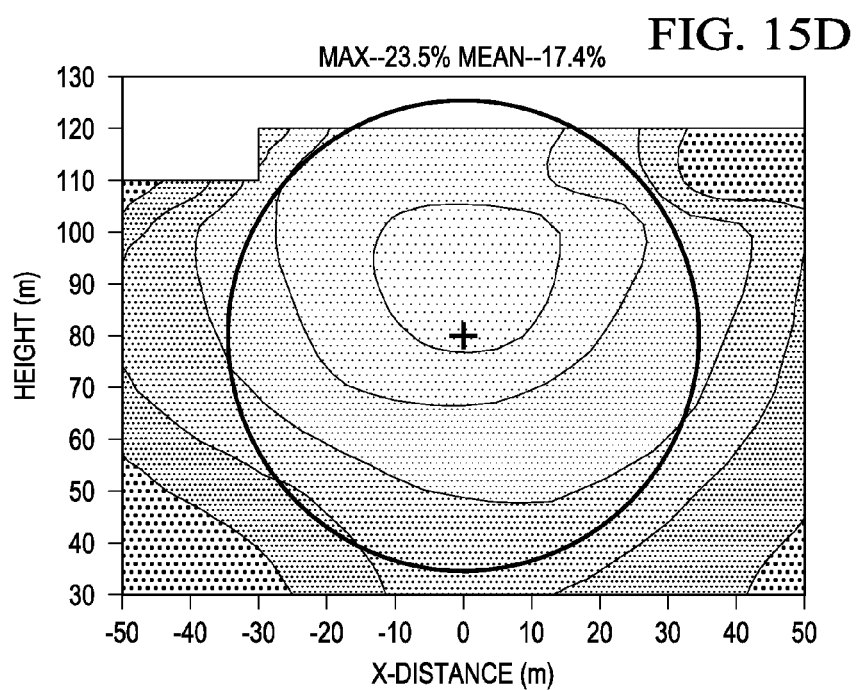
FIG. 15D

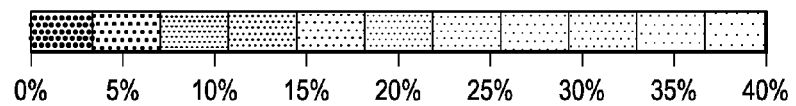
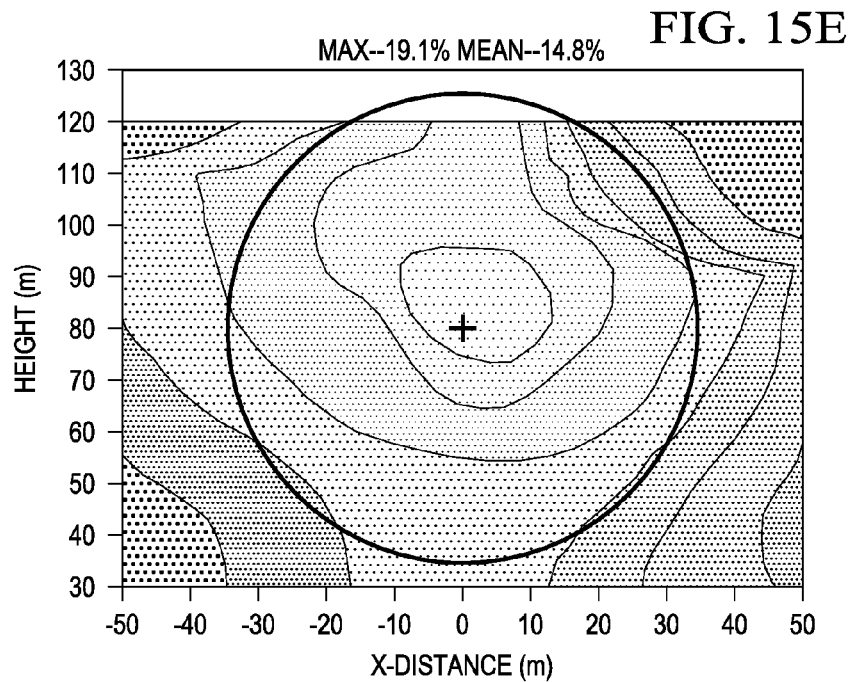
FIG. 15E
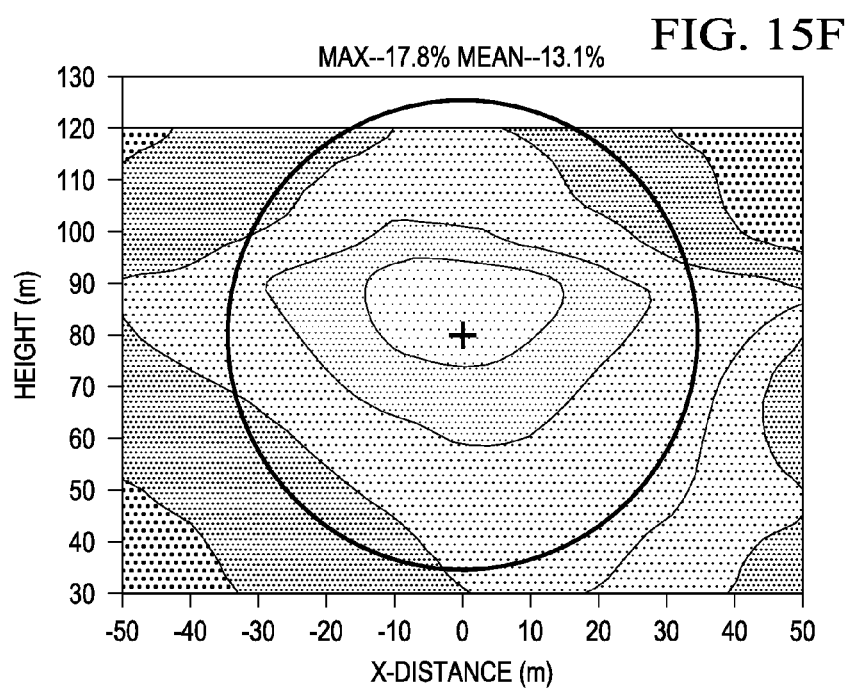
FIG. 15F

APPARATUS AND METHOD FOR USING RADAR TO EVALUATE WIND FLOW FIELDS FOR WIND ENERGY APPLICATIONS

PRIORITY CLAIM AND CROSS-REFERENCE TO RELATED APPLICATIONS

This patent application claims priority to U.S. Provisional Patent Application Ser. No. 61/676,394 filed on Jul. 27, 2012 and U.S. Provisional Patent Application Ser. No. 61/683,022, filed on Aug. 14, 2012, the entire contents of which are incorporated herein by reference.

This patent application is related to U.S. patent application Ser. No. 13/952,606 filed on Jul. 17, 2013, PCT Patent Application No. PCT/US2013/052435 filed on Jul. 27, 2013 and PCT Patent Application No. PCT/US2013/052434 filed on Jul. 27, 2013.

STATEMENT OF FEDERALLY FUNDED RESEARCH

This invention was made with government support under Grant No. DE-FG-06-GO86092 awarded by the United States Department of Energy Congressionally Directed Project: Great Plains Wind Power Test Facility. The government has certain rights in the invention.

FIELD OF THE INVENTION

The present invention relates generally to the field of radars and, more particularly, to an apparatus and method for using radar to evaluate wind flow within and nearby wind farms.

BACKGROUND OF THE INVENTION

Understanding the structure and evolution of flow fields within wind farms is essential to properly plan wind farms and estimate wind turbine and farm efficiency. Turbine wakes maintain wind speed deficits relative to the free stream flow and enhanced turbulence capable of providing higher dynamic loads to downwind turbines. Although only a few observational studies on the impact of turbine wakes exist, initial findings suggest power output decreases for individual wake-influenced turbines can reach 40%. Total power output loss due to wake influences across a large wind farm can be as large as 20%. [1] The character of turbine wakes directly relates to appropriate turbine spacing and associated infrastructure costs. Accurately forecasting the expected total power output of a large wind park on short temporal scales requires a full understanding of the complex modulated flow fields within the wind farm itself.

A multitude of numeric simulations (LES, CFD, etc.) has been conducted in an attempt to quantify the structure and effect of turbine wakes. Reference [1] (Barthelmie et. al.) listed below provides a detailed list of concerns when applying these simulation results to the real atmosphere and full-scale turbine systems. Among other limitations, current numeric simulations are not yet capable of accurately handling the natural variability of atmospheric stability and turbulence as well as complex underlying terrain. The net result is a systematic underprediction of wake losses within a large wind farm. Additionally, the computational expense of accurately incorporating turbine and blade geometry into simulations remains large, requiring the employment of simplified approaches that do not exactly represent reality.

[3] Despite these limitations, wake modeling efforts are necessary as current observational capabilities are not yet able to provide the spatial and temporal resolution needed to document the full range of scales within a turbine wake in the real atmosphere. However, to validate the simulation results, expansion of existing observational capabilities and coverage is vital.

To date, observational studies of the horizontal influence of turbine wakes are limited to sparse tower, sodar, and/or LIDAR measurements. Fixed meteorological tower measurements provide valuable "ground truth" data but are inherently limited in their horizontal and vertical coverage. Sodar is limited in its ability to document flow fields beyond time averaged vertical wind profiles of horizontal wind speeds. Scanning and staring LIDAR systems can provide for quantification of the flow fields (including inflow and wake flow) but are limited with respect to range, range resolution and temporal revisit times relative to radar technology. Existing LIDAR technologies also do not provide information during periods of precipitation, and have exhibited less reliability for long-term field deployments.

Existing published wake studies indicate that current LIDAR technology is handcuffed by the inverse relationship between maximum range and along-beam range resolution. This limitation precludes the ability to fully observe wakes of significant length or wake interaction over the footprint of a large wind farm using current LIDAR technology. The maximum presented along-beam range gate spacing from scanning LIDAR wake studies is 30 m [4] using the National Oceanic and Atmospheric Administration (NOAA) High-Resolution Doppler LIDAR [5].

Accordingly there is a need for an apparatus and method to more accurately evaluate wind flow upstream, downstream and/or within wind farms to provide better optimization of wind farm layouts and operations.

SUMMARY OF THE INVENTION

The present invention provides an apparatus and method to better evaluate wind flow upstream, downstream and/or within wind farms to provide better optimization of wind farm layouts and operations. The present invention uses, as an example, a specific Doppler radar technology to document the inflow and wake flow measurements surrounding a single wind turbine. The same technology can be employed to document the upstream, downstream and modulated flow fields surrounding and within large portions of the entirety of a wind farm. Note that other suitable types of radar may also be used. These data and subsequent analysis results are expected to serve as a catalyst for future wake observations and simulation improvements, leading to optimized wind turbine layouts, refined design of control systems, and the development of "smart" wind farms to help reduce the cost of energy.

Remotely sensed turbine wake observations using LIDAR technology have proven effective; however, the presented radar capabilities provide a larger observational footprint and greater along-beam resolution than current scanning LIDAR systems. Plan-position indicator and range-height indicator scanning techniques are utilized to produce various wake analyses. Preliminary analyses confirm radial velocity and wind speed deficits immediately downwind of the turbine hub to be on the order of 50%. The present invention allows for a more comprehensive analysis of the modulated flow field within and surrounding a wind farm using one or more strategically placed radars. This includes the documentation and evolution of wake structure and meandering characteristics, the influence of local terrain on wind flow, identification of abrupt flow changes due to mesoscale and microscale meteorological phenomena (e.g., thunderstorm outflows, fronts and drylines), documentation of vertical profiles of wind speed and direction to better define inflow, and identification of turbine-turbine induced interactions.

More specifically, the present invention provides a method for obtaining data to determine one or more characteristics of a wind flow field by providing one or more radars, collecting data from the one or more radars, and determining the one or more characteristics of the portion of the wind flow field by analyzing the data using one or more processors. The one or more radars are positioned to have a portion of the wind flow field within a scanning sector of the one or more radars.

In addition, the present invention provides a method for determining one or more characteristics of a wind flow field by providing a data from one or more radars positioned to scan a portion of the wind flow field, and determining the one or more characteristics of the portion of the wind flow field by analyzing the data using one or more processors.

Moreover, the present invention provides an apparatus for obtaining data to determine one or more characteristics of a wind flow field that includes one or more radars, and one or more processors that collect a data from the one or more radars, and determine the one or more characteristics of a portion of the wind flow field by analyzing the data using one or more processors. The one or more radars are positioned to have a portion of the wind flow field within a scanning sector of the one or more radars.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 4 shows a PPI sector scan of radial velocity from TTUKa2 radar at a 1.8° beam elevation on 9 Jan. 2013 in accordance with one embodiment of the present invention;

FIG. 10A shows a plan view of the radial velocity gridded analysis at 80 m (hub height) along with gridded vertical cross sections upwind of and through the wake at various rotor diameter (D) distances downwind in accordance with one embodiment of the present invention;

FIG. 11A shows a plan view of the spectrum width gridded analysis at 80 m (hub height) along with gridded vertical cross sections upwind of and through the wake at various downwind D distances in accordance with one embodiment of the present invention;

FIGS. 15A-15F are vertical slices of the reduction (%) in horizontal wind speed within the wake composited from 72 dual-Doppler volumes at (A) 1D, (B) 2D, (C) 5D, (D) 7D, (E) 10D, and (F) 12D downwind in accordance with one embodiment of the present invention;

DETAILED DESCRIPTION OF THE INVENTION

Figure 1A:
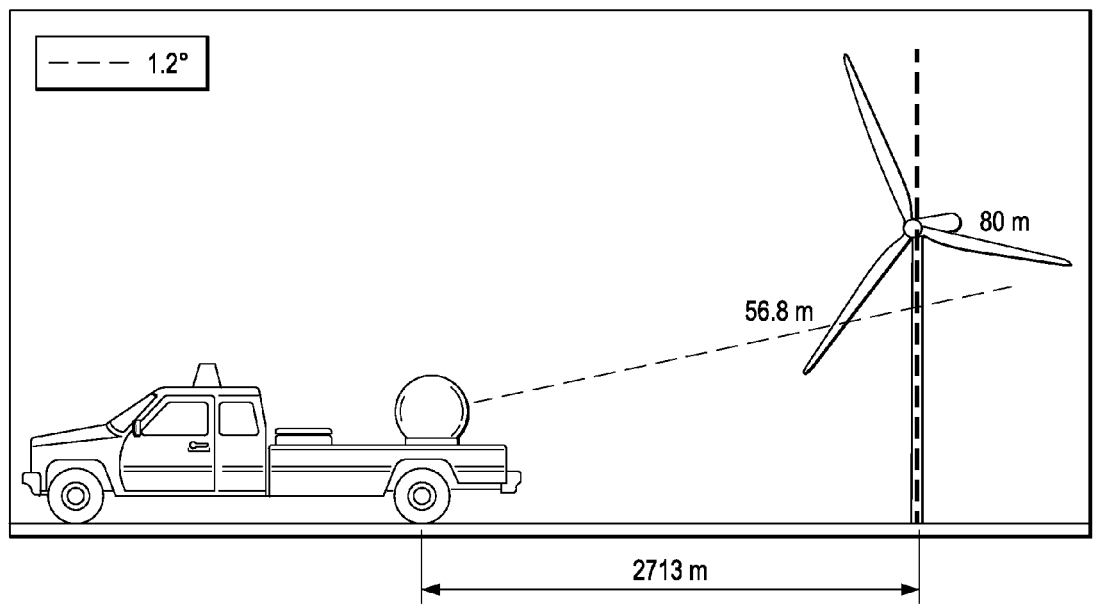
FIGS. 1A and 1B are various views of a Doppler radar deployment with respect to a wind turbine in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to wind flows in the vicinity of wind farms, but it will be understood that the concepts of the present invention are applicable to evaluating wind flows in and around other areas of interest. Moreover, the discussion relates to examples using specific mobile Doppler radar units, but it will be understood that the concepts of the present invention are applicable to other types of radar technologies. These permutations include the use of fixed and mobile platforms, the use of different transmitters (magnetron, klystron, traveling wave tubes, etc.) and receiver technologies (e.g. different amplifiers and filters), the use of different wavelengths of radiation, the use of different processors, the use of different hardware components (antennas, pedestals, etc.), and/or the ability to provide or not provide pulse compression technologies. For example, suitable microwave frequency bands include: W-band (75 to 110 GHz); V-band (50 to 75 GHz); Ka-band (26.5 to 40 GHz); K-band (18 to 26.5 GHz); Ku-band (12 to 18 GHz); X-band (8 to 12 GHz); C-band (4 to 8 GHz); and S-band (2 to 4 GHz).

The present invention provides a wind field defined with sufficient resolution to document flow field perturbations of importance to wind turbine and wind farm response. From the generated fields, modulated flow fields within a wind farm can be documented, available power can be estimated, information about the vertical profile of horizontal wind across the rotor sweep can be identified, areas of enhanced turbulence can be tracked in time, and localized events (such as a thunderstorm outflow) can be proactively recognized. As a result, the present invention can be used to document wind turbine wakes, perform enhanced power performance testing (i.e. more comprehensive documentation of inflow conditions relative to turbine power generation), enhance wind farm turbine layout (existing commercial codes are based on assumptions which this technology can validate in full scale), and conduct site specific resource assessment (defining localized wind flow prior to or after turbine deployment). Other uses may include wind turbine and wind farm performance optimization including the development of "smart" wind farms based on integrating the generated flow and power fields into turbine and wind farm controls, mitigation of turbine loads through anticipatory control based on the remotely sensed flow and turbulence fields. The techniques described herein can be used to help lower the cost of wind energy through optimized wind turbine/farm performance and enhanced reliability.

Note, however, that the present invention can provide a more general usage toward documenting "complex flows," such as those induced by local terrain. The wind mapping capabilities will also allow for a wind farm operator to make anticipatory control decisions. For instance, if a thunderstorm outflow is pushing into the wind farm from a given direction, the wind mapping capability will reveal the outflow and allow the wind farm to make smart decisions proactively, instead of reactively. Some specific examples of how the present invention can be implemented and used with respect to wind farms will now be described to better illustrate the present invention without limiting the scope of the present invention.

High spatial and temporal resolution radial velocity measurements surrounding a single utility-scale wind turbine were collected using the Texas Tech University Ka-band mobile research radars. LIDAR utilizes the Doppler effect to obtain a remotely sensed along-beam measurement of the wind velocity vector. The advantages of research-grade LIDAR systems include their compact size and narrow beamwidths, which are generally less than 0.5 m. Recent full-scale measurements using scanning LIDAR technology have proven effective when observing wind turbine wakes. [4,6] These measurements have shown the effects of turbine wakes to extend beyond 10-15 rotor diameters (D) downwind. Research-grade Doppler radar systems provide the opportunity to expand the LIDAR coverage footprint with increased range resolution while utilizing adaptive scanning strategies. Here, an introduction to using research radar for wake detection and monitoring will be presented.

For example and without limiting the present invention, Texas Tech University (TTU) designed and constructed two mobile Ka-band (35 GHz) Doppler radar systems (hereafter referred to as "TTUKa"). These systems were developed to observe various aspects of the atmospheric boundary layer with a high level of sensitivity and spatial resolution. The TTUKa radars represent the first research-grade mobile Doppler systems to use a nonlinear pulse-compression frequency modulation technique in the Ka band. [7] The transmitted signal is generated using a fully coherent traveling wave tube amplifier; thus, no velocity noise (error) is present. The pulse-compression technique allows for accurate radial velocity measurements using a relatively long pulse width while maintaining improved range resolution when compared to traditional radar systems. The half-power beamwidth is 0.49°. The along-beam range gate spacing is 15 m and is a function of modulation bandwidth. Additional technical specifications for the TTUKa radar units can be found in Table 1.

TABLE 1

| Parameter | Specifications |
| --- | --- |
| Peak transmit power | 212.5 W |
| Transmit frequency | 35 GHz |
| Wavelength | 8.6 mm |
| Antenna diameter | 1.22 m |
| Half-power beamwidth | 0.49° |
| $dBZ_0$ | −38.5 dBZ |
| Pulse length | 12.5, 20, 30 µm |
| Range gate spacing | 15 m |
| Pulse repetition frequency | 5000-15,000 Hz |
| Maximum range | 10-30 km |
| Azimuthal (PPI) resolution | 0.352° |
| Elevation (RHI) resolution | 0.1° |
| Horizontal scan speed | 24° $s^{-1}$ to 30° $s^{-1}$ |
| Vertical scan speed | 6° $s^{-1}$ |

In the mobile units, each radar is truck mounted, which allows for mobility to and around a desired scanning location. The radar systems are designed to operate during extreme meteorological environments including thunderstorms and hurricanes. A radome protects the antenna from wind loading, wind-borne debris, hail, and miscellaneous hazards during transit. A hydraulic leveling system levels the radar during deployment and the radar is operated from within the truck cab. Each radar utilizes a Sigmet RVP-9000 signal processor and is capable of performing sector or full 360° horizontal plan-position indicator (PPI) sweeps (outside of the influence of the truck cab). Vertical range-height indicator (RHI) scanning from 0° to 90° along a single azimuth is also possible. Spatial oversampling is accomplished by collecting data every 0.352° (0.1° for PPI (RHI) scanning strategies.

Multiple custom scanning strategies can be interwoven to satisfy a variety of scanning goals. The TTUKa radars generally provide continuous coherent measurements out to the maximum range when distributed meteorological targets (water droplets, ice crystals, insects, aerosols, etc.) are present. To date, coherent radial measurements are often observed when scanning non-precipitating atmospheres, but coverage is intermittent in low relative humidity environments. An antenna upgrade is planned for both radars, and the net result will be an increase in clear-air sensitivity and azimuthal resolution. A limitation of Doppler radar measurements when compared to LIDAR is the effect of beam spread at large ranges. A beamwidth of 0.49° results in a beam spread of 17.1 m at 2-km range and 85.5 m at 10-km range. Following the scheduled upgrade, a beamwidth of 0.33° will reduce the azimuthal beam spread 33% to 11.5 m and 57.6 m at 2-km and 10-km ranges, respectively.

More specifically, one or more radars (e.g., TTUKa1) are positioned to have a portion of the wind flow field disposed within a scanning sector of the one or more radars. One or more processors (e.g., instruments, computers, etc.) collect a data from the one or more radars and determine the one or more characteristics of the portion of the wind flow field by analyzing the data using the one or more processors. The one or more radars can be a Doppler radar or other suitable types of radar technologies. These permutations include the use of fixed and mobile platforms, the use of different transmitters (e.g., magnetron, klystron, traveling wave tubes, etc.) and receiver technologies (e.g., different amplifiers and filters), the use of different wavelengths of radiation, the use of different processors, the use of different hardware components (e.g., antennas, pedestals, etc.), and/or the ability to provide or not provide pulse compression technologies. For example, suitable microwave frequency bands include: W-band (75 to 110 GHz); V-band (50 to 75 GHz); Ka-band (26.5 to 40 GHz); K-band (18 to 26.5 GHz); Ku-band (12 to 18 GHz); X-band (8 to 12 GHz); C-band (4 to 8 GHz); and S-band (2 to 4 GHz). Moreover, one or more additional radars can be positioned to have the portion of the wind flow field or another portion of the wind flow field within an additional scanning sector for the additional radars. As will be described in more detail below, the data may include a vertical range-height indicator, a horizontal plan-position indicator, or interpolated (e.g., gridded) horizontal wind flows describing a wake of one or more turbines and a free-stream radial velocity field surrounding the wake.

In the absence of turbines, the same type of deployment as shown here could be used to simply map the wind flow field over a large spatial area, and be advantageous for providing enhanced resource assessment and investigating the impact of local terrain. The results can also be used for anticipatory control if an abrupt change in wind speed/direction was approaching a wind farm or turbine. One main advantage of these Doppler radar analyses employing radar data is that a continuous horizontal and/or vertical wind flow field can be mapped over a relatively large spatial area. The vast majority of current operational turbines are only capable of sensing the wind features that are already passing through them. They have no awareness and no proactive response to prepare for a coming change in the flow regime.

Figure 1B:
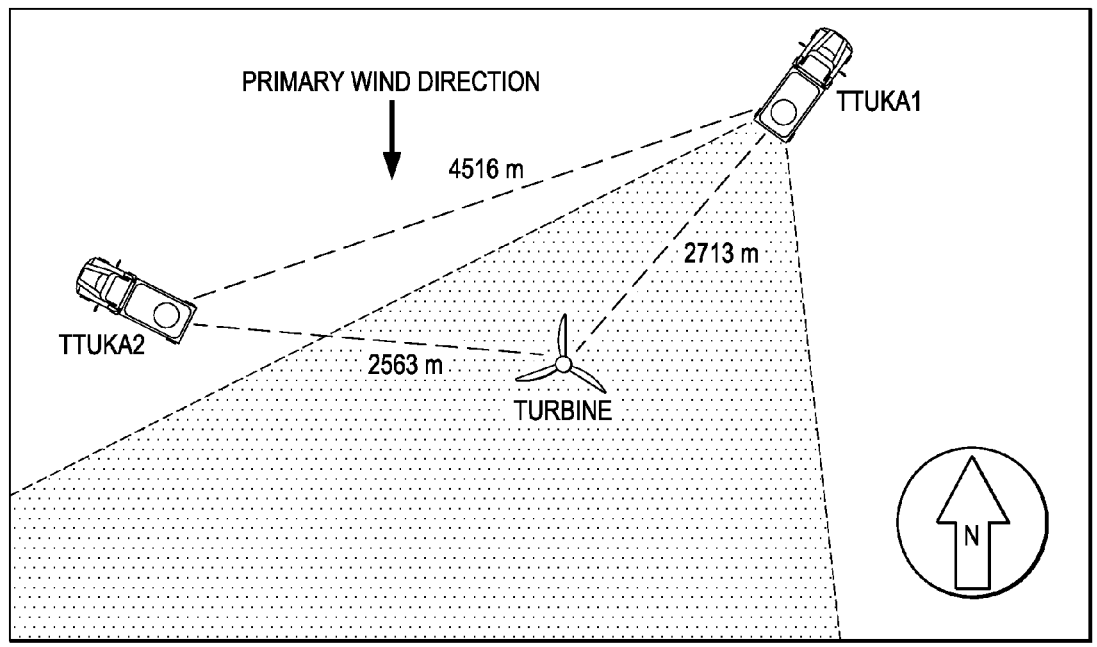

In one example, six hours of radar data were acquired by both TTUKa radars (TTUKa1 and TTUKa2) of the flow surrounding a single utility-scale turbine in West Texas. FIGS. 1A and 1B are various views of a Doppler radar deployment in which a single radar (TTUKa1) was used document the structure and evolution of a single utility-scale turbine wake on Oct. 27, 2011. A pulse length of 12.5 ms was used along with a pulse repetition frequency of 7500 Hz, yielding a maximum range of 20 km. Repetitive 20° PPI sector scans were collected. Data were collected during continuous light to moderate rainfall. The turbine hub height was 80 m and the turbine rotor diameter was 86 m. TTUKa1 was positioned at a distance of 2713 m north-northeast of the turbine. At this bearing, the turbine was oriented closely parallel to the mean wind direction (from the north through northeast) downwind of TTUKa1.

TTUKa1 performed 208 sector scans at an elevation angle of 1.2° for 30 minute collection period. This elevation angle was chosen to maximize beam residence within the wake. At the location of the turbine and at 6-km range, the beam height was 56.8 and 125.7 m AGL, respectively. Because of beam misalignment with the true wind vector, radial velocity measurements will generally reflect values less than the actual wind speed. For example, a radial velocity measurement will be 1.5% less than the true wind speed for a beam misaligned by 10° and 13.4% for a beam misaligned by 30°. Because of the 0.49° beamwidth, the azimuthal beam spread at the location of the turbine was 23 m. The sector revisit time was 3 s, allowing for a high temporal depiction of wake evolution.

Figure 2A:
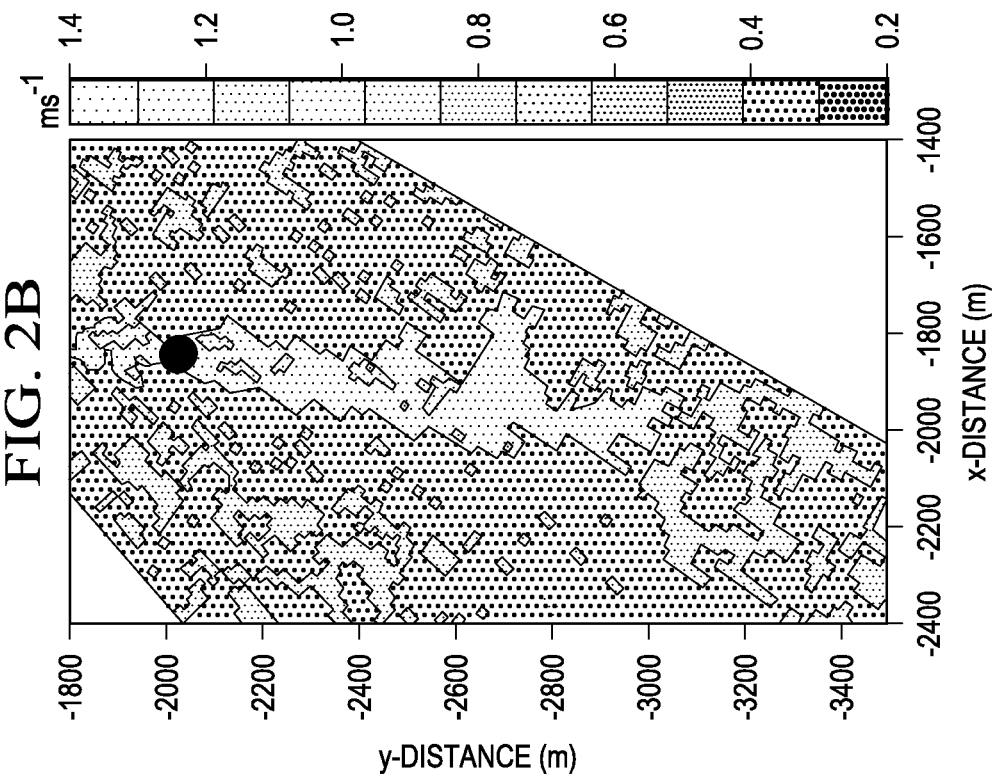
FIGS. 2A-2D show a plan-position indicator (PPI) sector scan of radial velocity and spectrum width from both radars at a 1.2° beam elevation in accordance with one embodiment of the present invention.
Figure 2B:
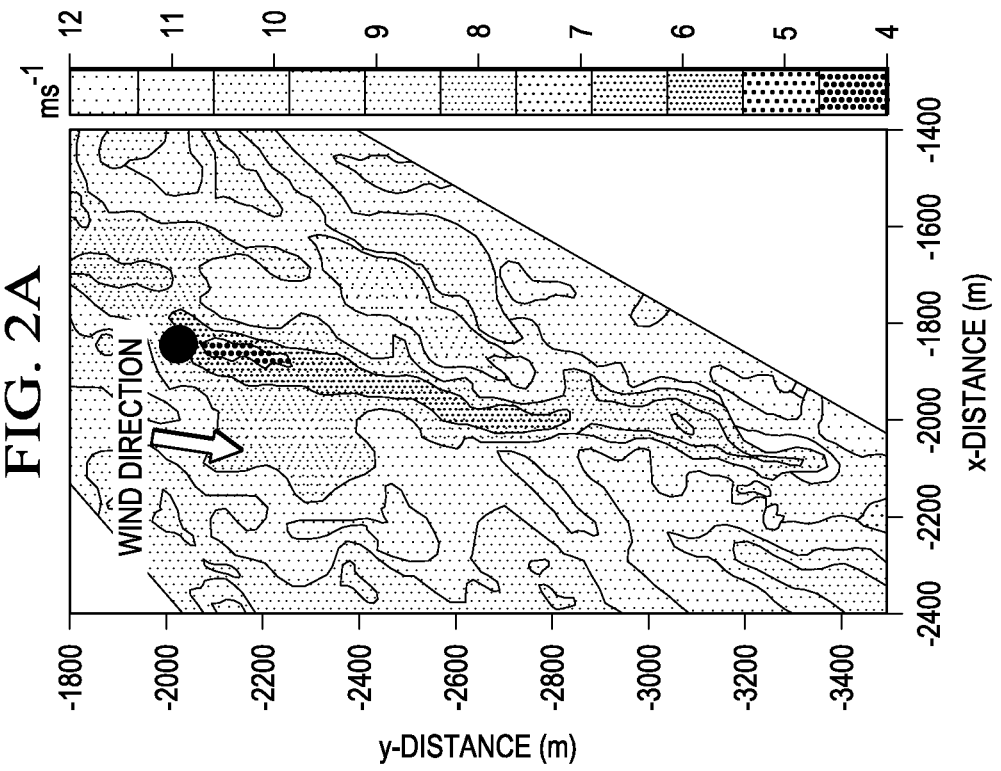
Figure 2D:
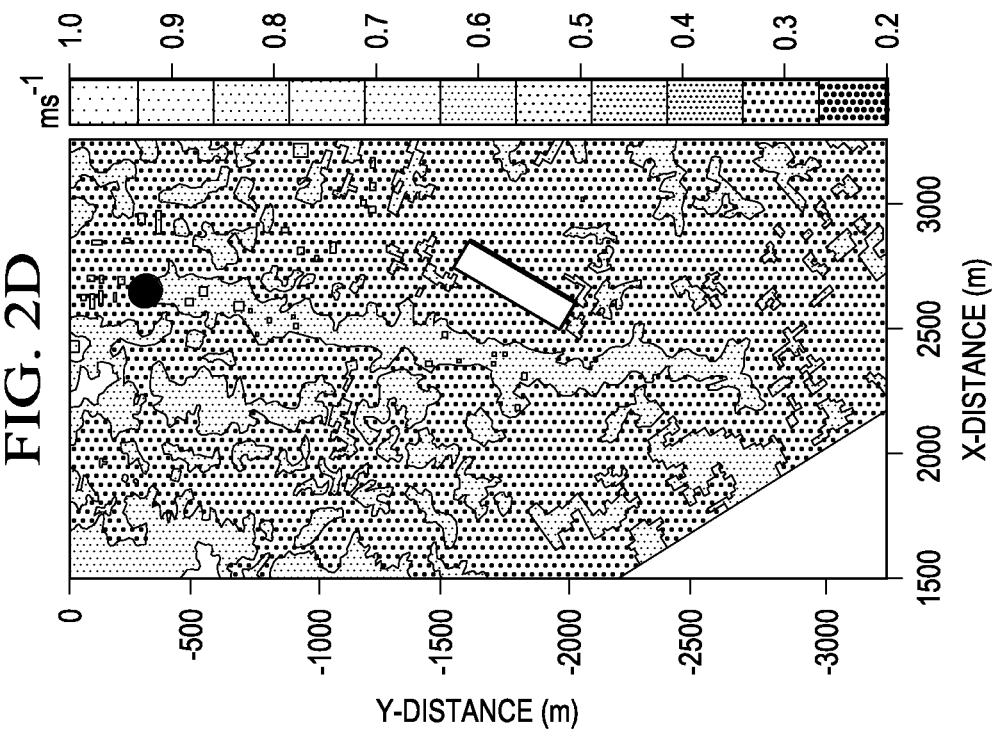
Figure 2C:
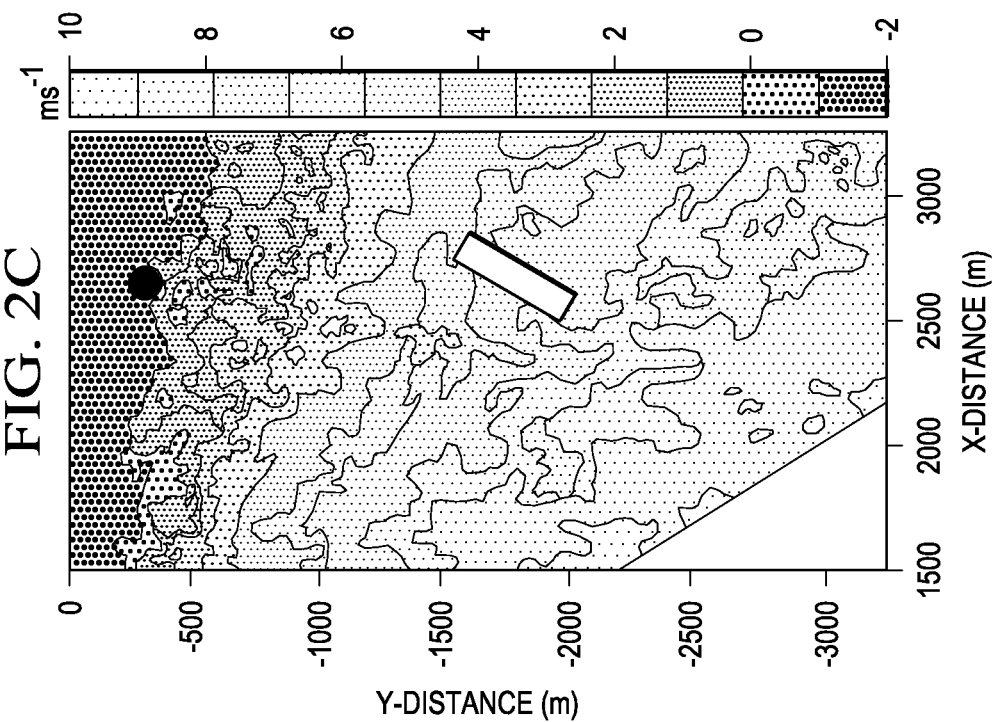
Figure 3A:
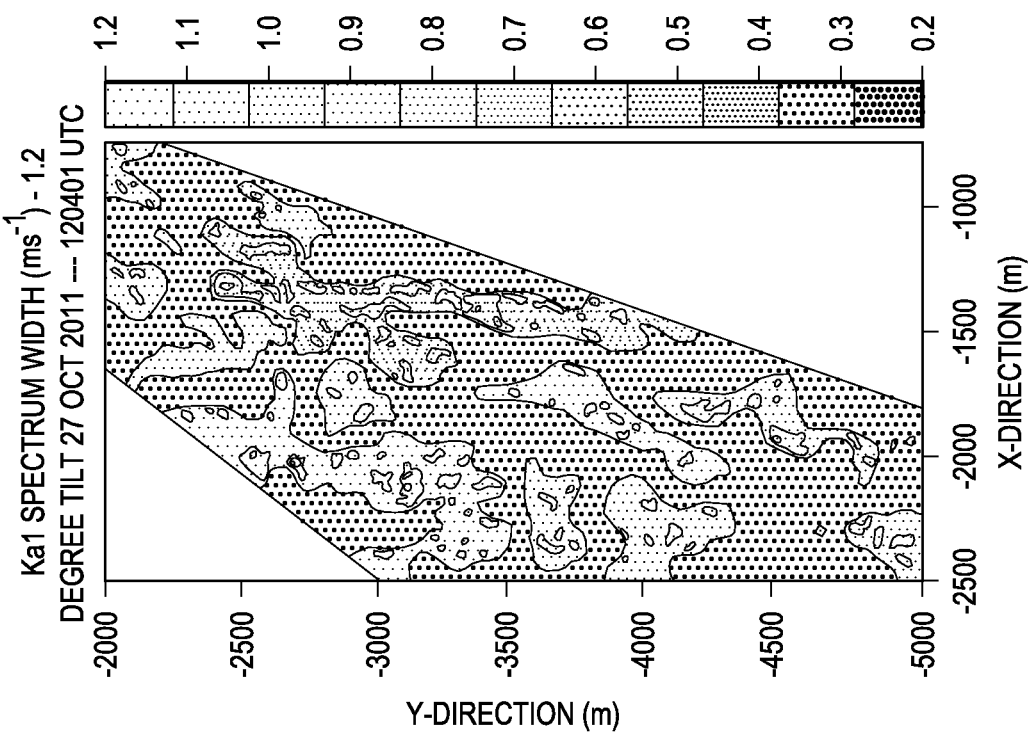
FIGS. 3A and 3B correspond to FIGS. 2A and 2B respectively, but show the scans for a larger area in accordance with one embodiment of the present invention.
Figure 3B:
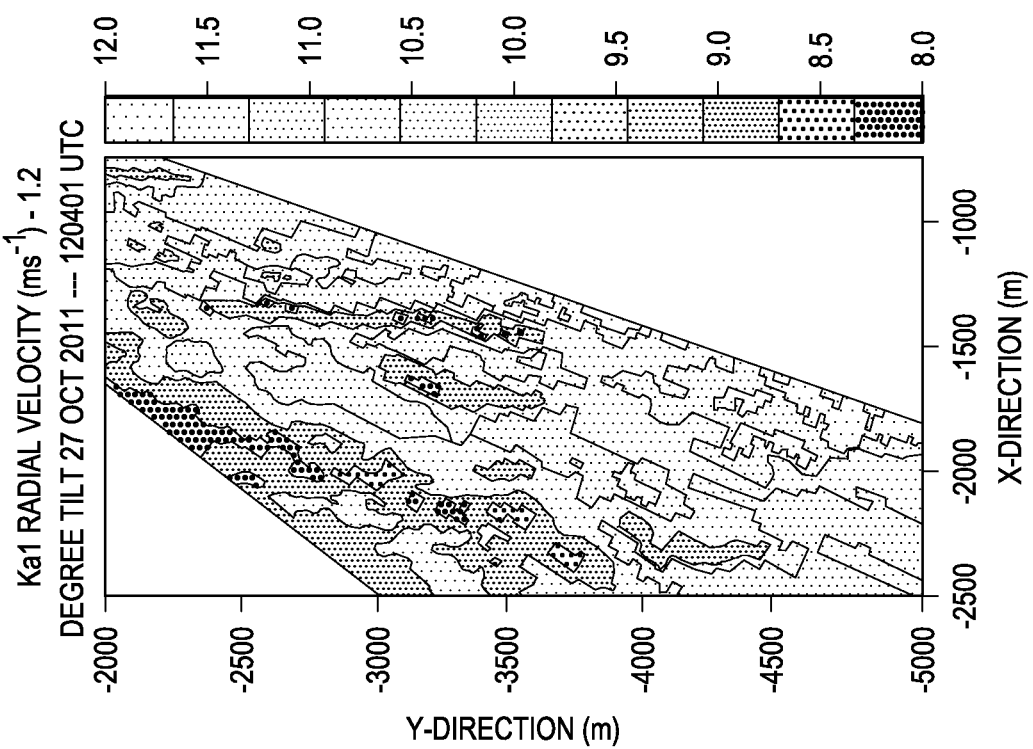

Now referring to FIGS. 2A-2D, a PPI sector scan of radial velocity and spectrum width from both TTUKa radars at a 1.2° beam elevation are shown in accordance with one embodiment of the present invention. FIG. 2A shows the PPI sector scan of radial velocity (m s$^{-1}$) for TTUKa1. FIG. 2B shows the PPI sector scan of spectrum width (m s$^{-1}$) for TTUKa1. FIG. 2C shows the PPI sector scan of radial velocity (m s$^{-1}$) for TTUKa2. FIG. 2D shows the PPI sector scan of spectrum width (m s$^{-1}$) for TTUKa2. The location of the turbine is denoted by the black dot. The prevailing wind direction is also shown. An area of ground targets has been removed from the TTUKa2 analyses. Assuming a conservative upwind radial velocity of 9 m s$^{-1}$ from TTUKa1, radial velocity deficits in excess of 50% can be seen immediately downwind of the turbine (FIG. 2A). Similar LIDAR analyses from Käsler et al. [6] from the wake of a megawatt turbine in comparable wind speed conditions show radial velocity deficits at hub height of 66% 1D downstream. The influence of the turbine wake in the TTUKa1 snapshot can be seen in excess of 15D downstream. Though the beam of TTUKa2 was not aligned with the mean wind direction, a radial velocity snapshot (FIG. 2C) shows the wake influence extending in excess of 30D downwind of the turbine, extending across the entire sector sampled. The spectrum width fields from both radars also show enhanced turbulence associated with the wake. Enhanced spectrum width can be seen at the interface between the turbine wake and the adjacent flow, where turbulence between these two regions is maximized, and where blade tip vortices are expected to reside [8]. Spectrum width provides an additional tool for tracking downwind wake length. FIGS. 3A and 3B correspond to FIGS. 2A and 2B respectively, but show the scans for a larger area. FIG. 4 shows a PPI sector scan of radial velocity from TTUKa2 radar at a 1.8° beam elevation on 9 Jan. 2013.

Figure 5A:
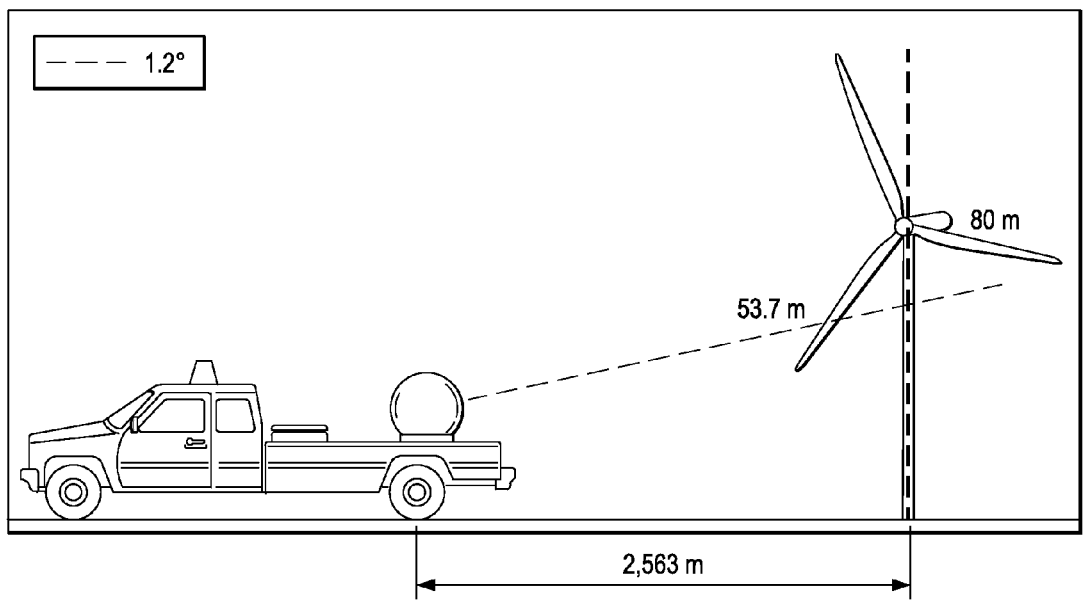
FIGS. 5A and 5B are various views of a Doppler radar deployment with respect to a wind turbine in accordance with one embodiment of the present invention.
Figure 5B:
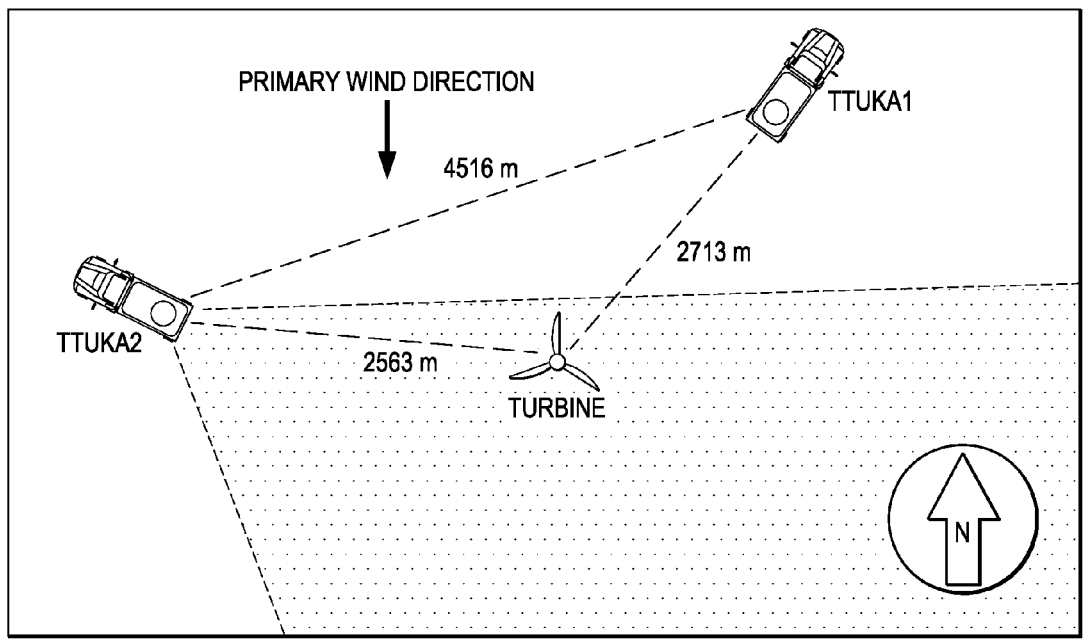

In another example, FIGS. 5A and 5B are various views of a Doppler radar deployment in which a single radar (TTUKa2) was used document the structure and evolution of a single utility-scale turbine wake on Oct. 27, 2011. A pulse length of 12.5 ms was used along with a pulse repetition frequency of 7500 Hz, yielding a maximum range of 20 km. Repetitive 50° PPI sector scans were collected. The turbine hub height was 80 m and the turbine rotor diameter was 86 m. TTUKa2 was positioned 2563 m west-northwest of the turbine. At the location of the turbine and at 6-km range, the beam height was 53.7. TTUKa2 performed 308 sector scans at the 1.2° elevation angle with a sector revisit time of 4.7 s. Azimuthal beam spread at the location of the turbine from TTUKa2 was 22 m and the beam height was 53.7 m.

Figure 6B:
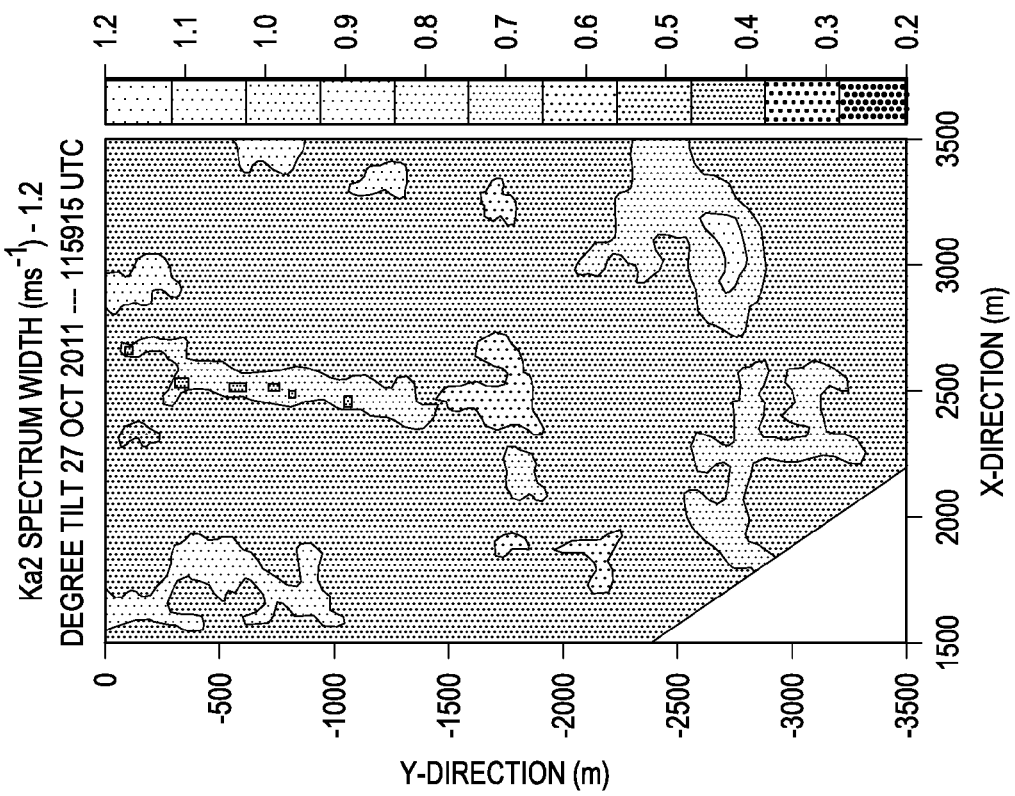
FIGS. 6A and 6B show a plan-position indicator (PPI) sector scan of radial velocity and spectrum width from TTUKa2 radar at a 1.2° beam elevation in accordance with one embodiment of the present invention.
Figure 6A:
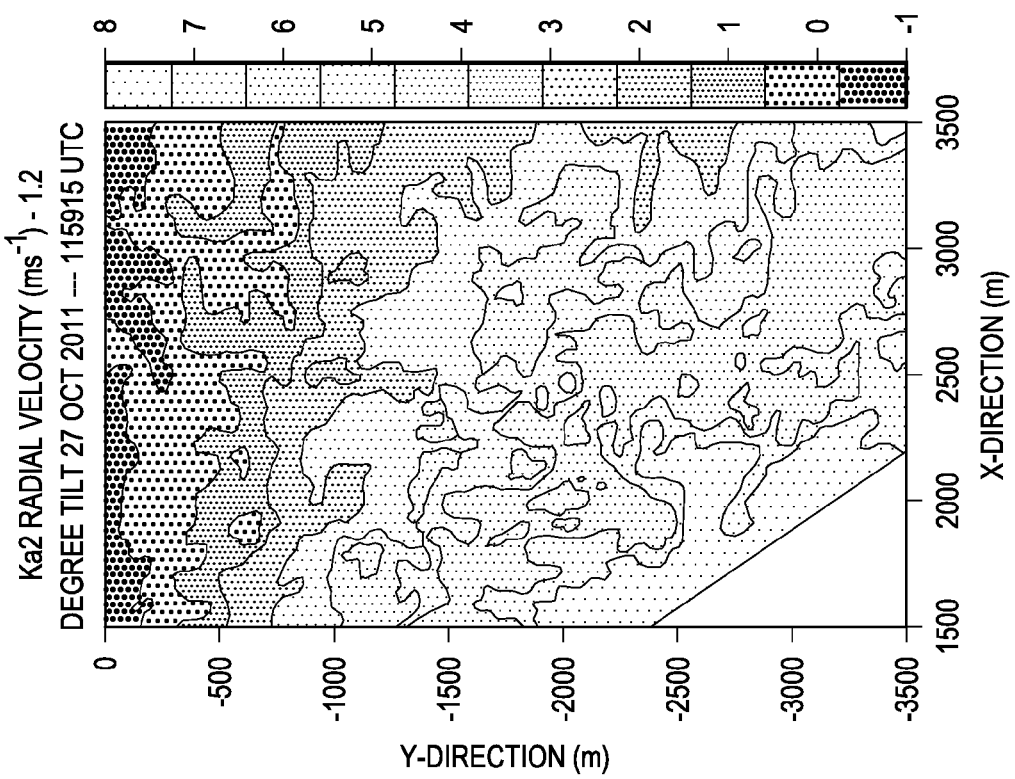

FIGS. 6A and 6B show a plan-position indicator (PPI) sector scan of radial velocity and spectrum width from TTUKa2 radar at a 1.2° beam elevation. The radial velocities are not representative of the wind field given the perpendicular look angle, but the wake is easily evident. The enhanced spectrum can be seen at the interface between the turbine wake and the adjacent flow, where turbulence between these two regions is maximized and were blade tip vortices are expected to reside.

Figure 7A:
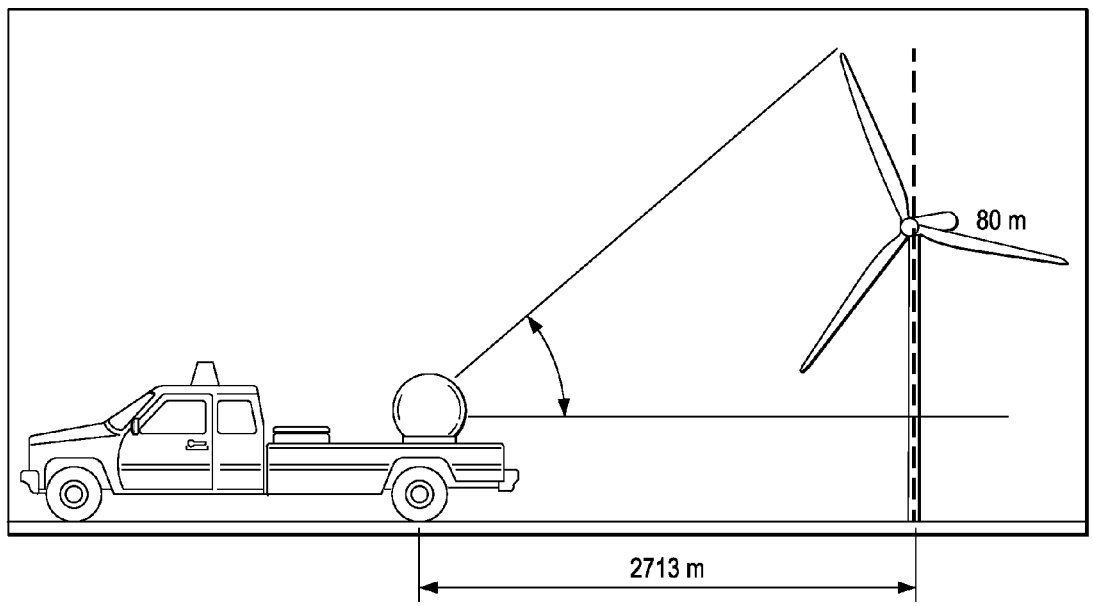
FIGS. 7A and 7B are various views of a Doppler radar deployment with respect to a wind turbine in accordance with one embodiment of the present invention.
Figure 7B:
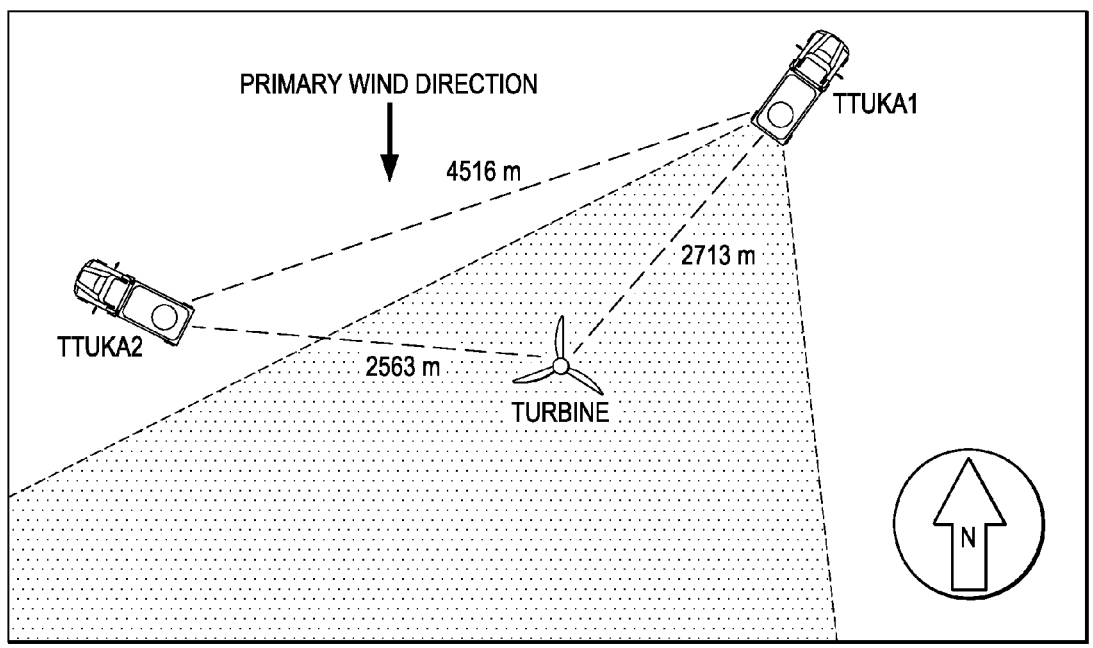

In yet another example, FIGS. 7A and 7B are various views of a Doppler radar deployment in which a single radar (TTUKa1) was used document the structure and evolution of a single utility-scale turbine wake on Oct. 27, 2011. A pulse length of 12.5 ms was used along with a pulse repetition frequency of 7500 Hz, yielding a maximum range of 20 km. Repetitive 30° RHI sector scans were collected. The turbine hub height was 80 m and the turbine rotor diameter was 86 m. TTUKa1 was positioned at a distance of 2713 m north-northeast of the turbine. At this bearing, the turbine was oriented closely parallel to the mean wind direction (from the north through northeast) downwind of TTUKa1. TTUKa1 performed sector scans at an elevation angles from 0° to 30°. The sector revisit time was 7 s.

Figure 8A:
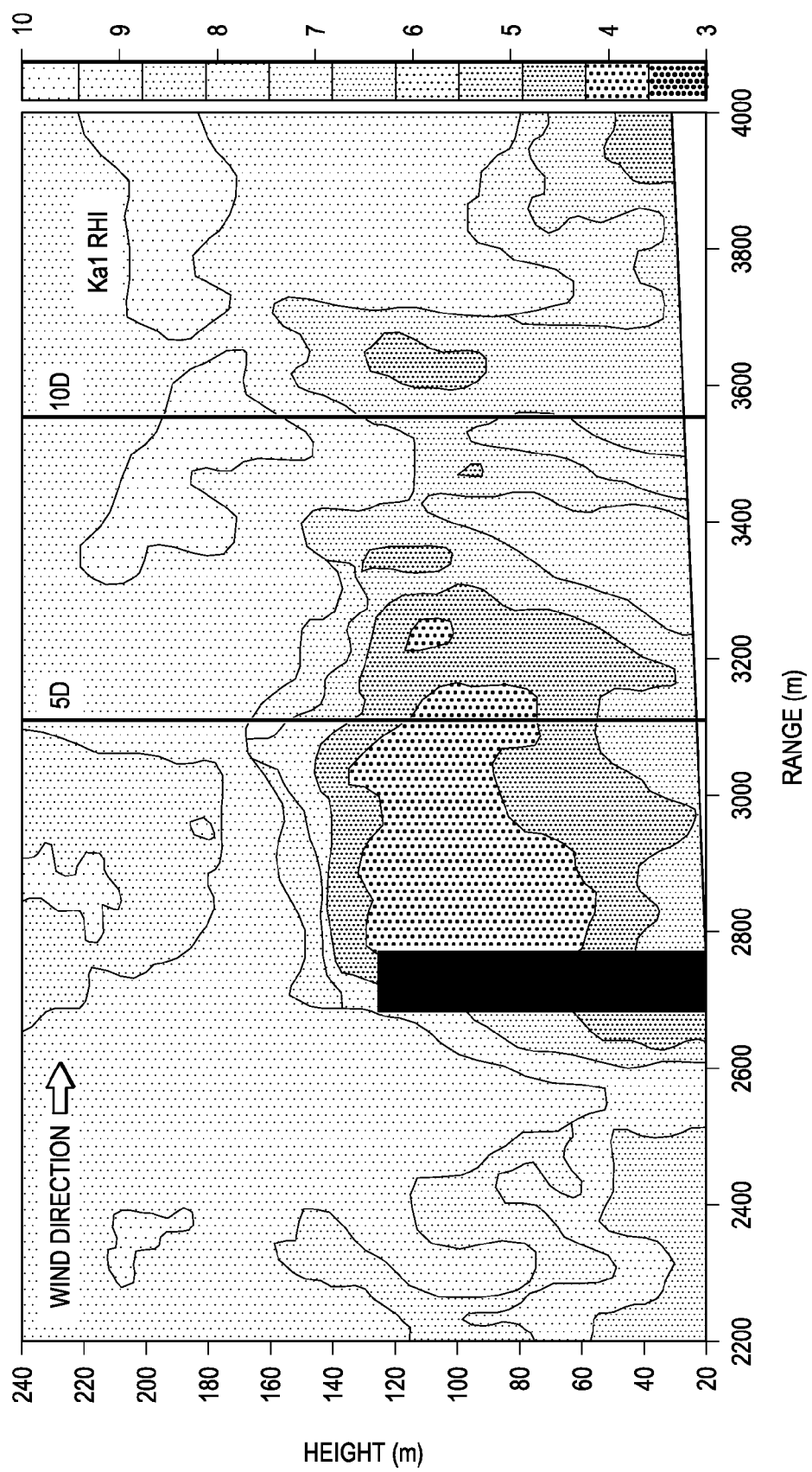
FIGS. 8A and 8B show a range-height indicator (RHI) sector scan of radial velocity and spectrum width between 0° and 30° elevation at a constant azimuth oriented through the turbine from the TTUKa1 radar in accordance with one embodiment of the present invention.
Figure 8B:
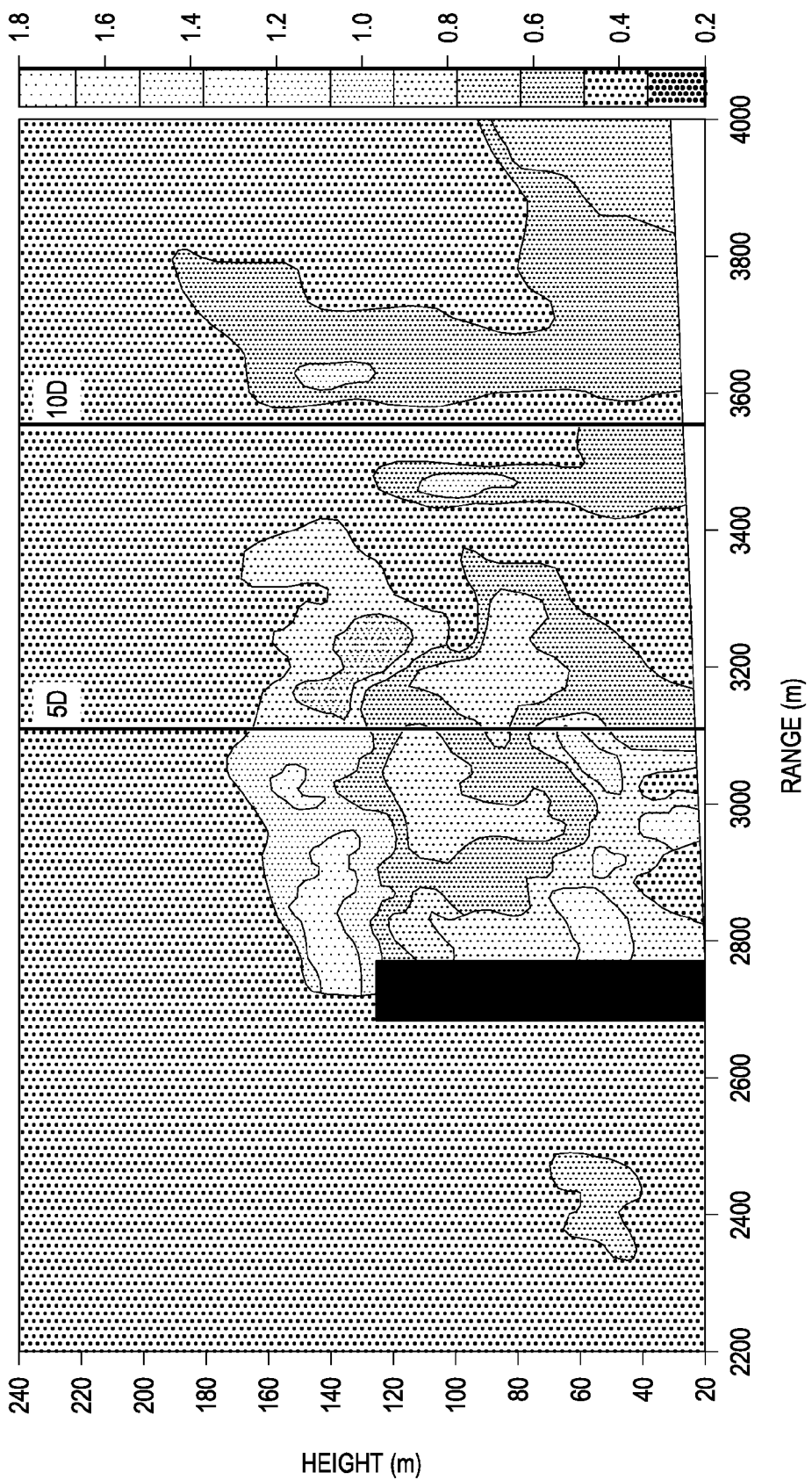

Now referring to FIGS. 8A and 8B, a RHI sector scan of radial velocity and spectrum width between 0° and 30° elevation at a constant azimuth oriented through the turbine from the TTUKa1 radar are shown in accordance with one embodiment of the present invention. FIG. 8A shows the RHI sector scan of radial velocity (m s$^{-1}$) for TTUKa1. FIG. 8B shows the RHI sector scan of spectrum width (m s$^{-1}$) for TTUKa1. The data was collection using long-duration, consecutive RHI scans. The scan revisit interval was 7 s, emphasizing a high temporal resolution to capture wake evolution in the vertical dimension. The influence of the turbine is denoted by the black vertical box. The thin vertical black lines indicate a distance of 5D and 10D downwind of the turbine (D=86 m). The prevailing wind direction is also shown. Using a conservative upwind radial velocity of 8 m s$^{-1}$ near hub height, wake deficits in excess of 50% are evident within 2D downwind of the turbine while farther downwind (beyond 6D) the effects of wake meandering become more evident. Though this cross section is not perfectly aligned with the downwind wake, wake effects in this RHI snapshot are evident in excess of 11D downstream of the turbine. Similar to the signature in the PPI scan presented, spectrum width (and therefore turbulence) in the RHI scan is maximized on the wake periphery. These analyses suggest a ring of maximized turbulence separates the wake from the ambient free stream flow immediately downstream of the turbine. The shape of this ring becomes highly variable and collapses with increased range as turbulent mixing and wake meandering complicate the wake structure.

Figure 9A:
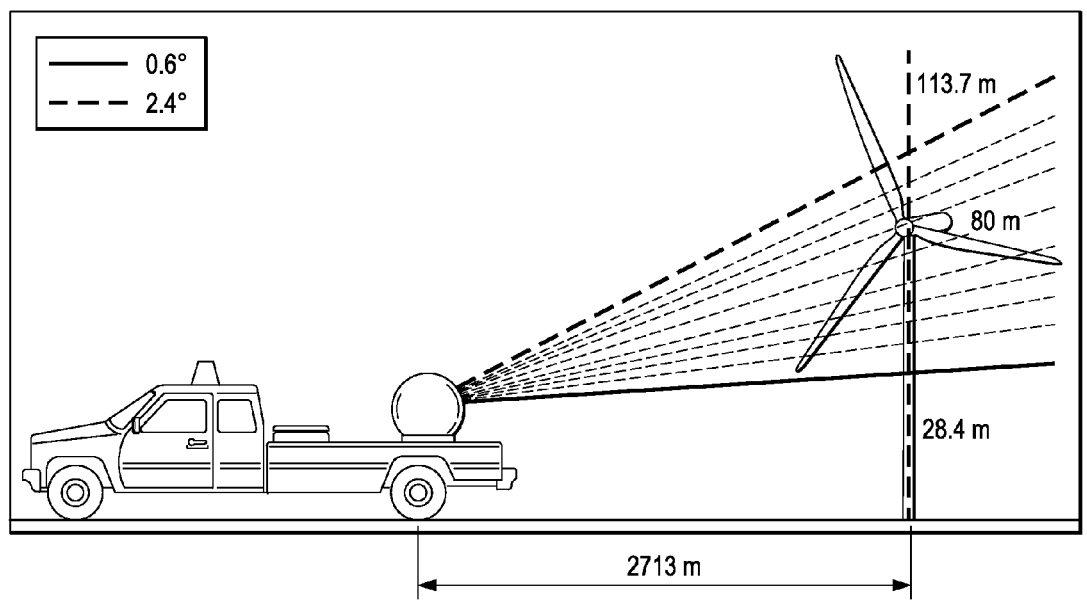
FIGS. 9A and 9B are various views of a Doppler radar deployment with respect to a wind turbine in accordance with one embodiment of the present invention.
Figure 9B:
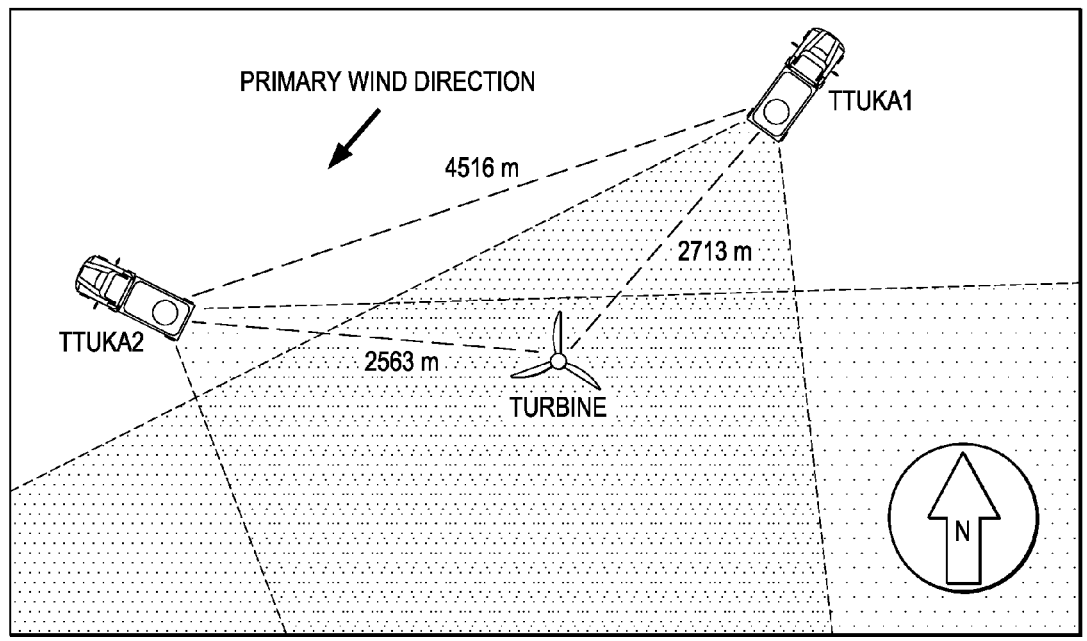

In another example, FIGS. 9A and 9B are various views of a dual Doppler radar deployment in which a both radars (TTUKa1 and TTUKa2) were used document the structure and evolution of a single utility-scale turbine wake on Oct. 27, 2011. A pulse length of 12.5 ms was used along with a pulse repetition frequency of 7500 Hz, yielding a maximum range of 20 km. Coordinated 30° sector volumes were collected. The turbine hub height was 80 m and the turbine rotor diameter was 86 m. TTUKa1 was positioned at a distance of 2713 m north-northeast of the turbine. Note that the wind direction has changed from the previous analysis period shown and described above. Both the wind direction and speed changed significantly during the collection time period. TTUKa2 was positioned 2563 m west-northwest of the turbine. Each radar scanned 10 elevation angles between 0.6° to 2.4° in 0.2° increments over a 30° sector. Each complete set of 10 scans, or volume, took approximately 45 seconds to complete. Both radars performed coordinated data collection. The sector revisit time was 45 s.

Referring now to FIG. 10A, a plan view of the radial velocity gridded analysis at 80 m (hub height) along with gridded vertical cross sections upwind of and through the wake at various downwind D distances are shown in accordance with one embodiment of the present invention. A single volume of data collected by TTUKa1 was interpolated to a three-dimensional grid to analyze the mean wake structure. The volume comprised 30° sector scans for 10 elevation angles taken every 0.2° between 0.6° and 2.4°. Data collection for the volume took approximately 45 s to complete. The turbine is located at the origin, denoted by the magenta dot.

Figure 10B:
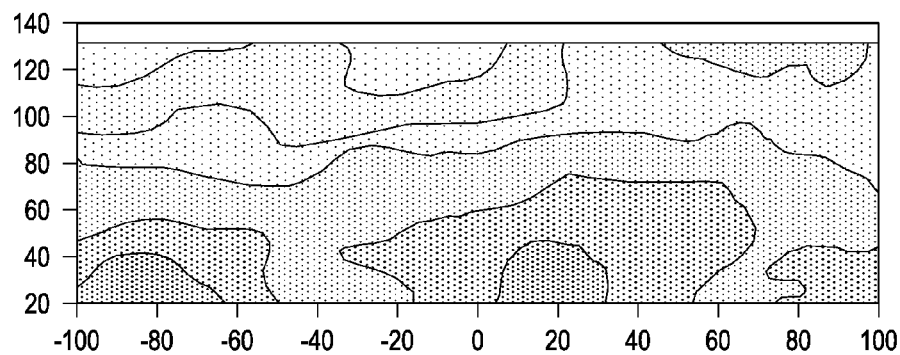
FIGS. 10B-10I shows various cross sections of FIG. 10A viewed from downwind looking back toward the turbine in accordance with one embodiment of the present invention.
Figure 10C:
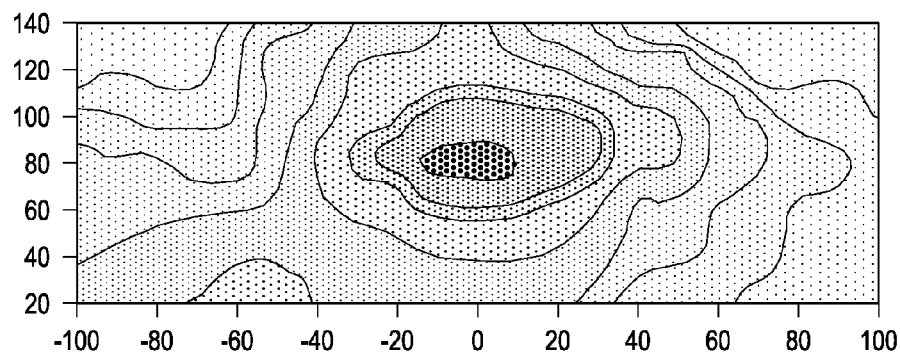
Figure 10D:
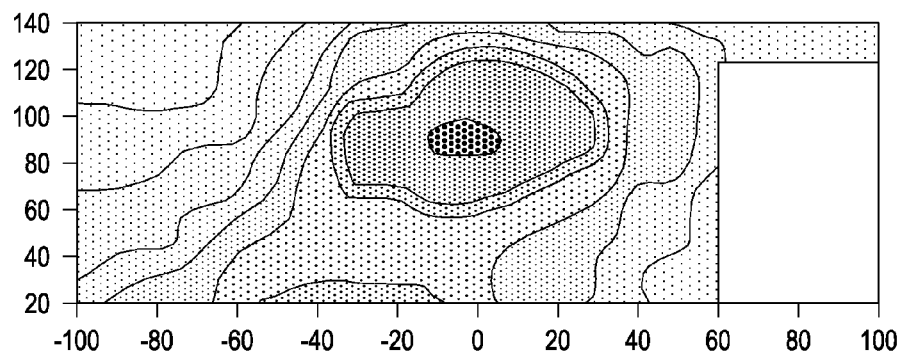
Figure 10E:
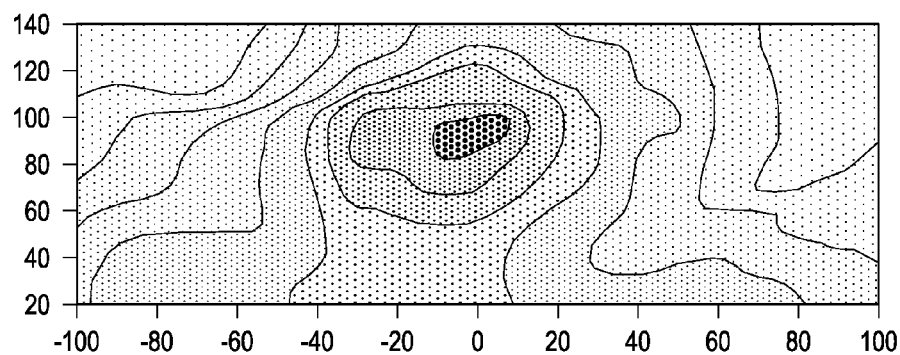
Figure 10F:
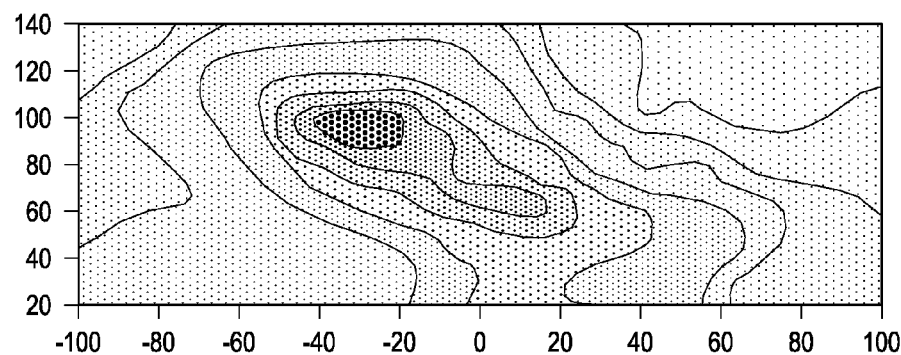
Figure 10G:
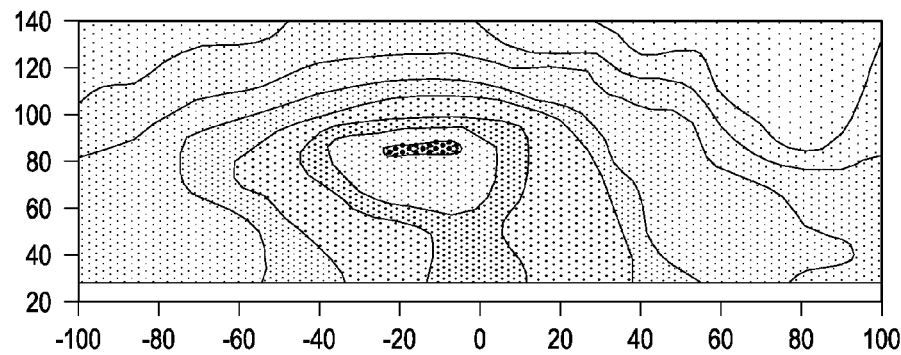
Figure 10H:
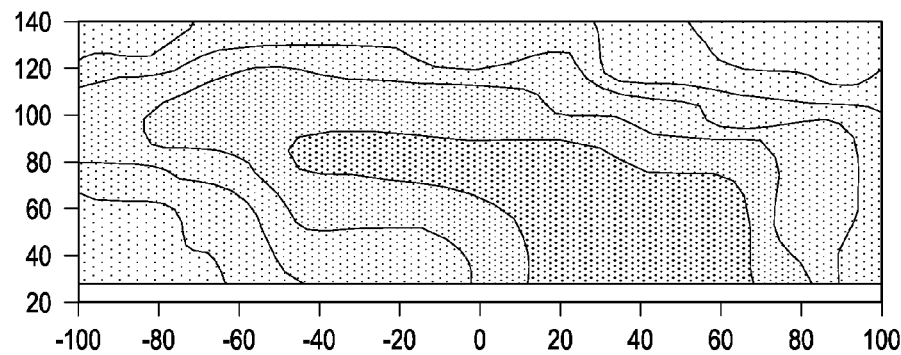
Figure 10I:
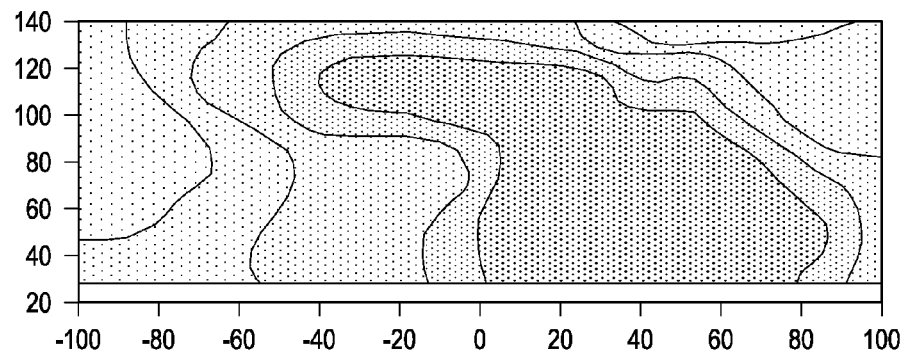

Now referring to FIGS. 10B-10I, various cross sections of FIG. 10A are viewed from downwind looking back toward the turbine in accordance with one embodiment of the present invention. The vertical cross sections oriented normal to the wake are shown at 1D upstream (FIG. 10B), 1D downstream (FIG. 10C), 2D downstream (FIG. 10D), 3D downstream (FIG. 10E), 5D downstream (FIG. 10F), 7D downstream (FIG. 10G), 10D downstream (FIG. 10H), and 15D downstream (FIG. 10I). Cross-section x axis is horizontal distance (m) and y axis is height (m). The color bar is shared for all panels. At 1D (FIG. 10C), the radial velocity deficit centered on the hub (x=0, y=80 m) is in excess of 40% of what is observed upstream (FIG. 10A). The 5D cross section shows a less defined wake structure; however, the influence of the wake is still evident at 10D. Beyond 10 D, the wake scales with the surrounding wind streaks in the ambient flow, and it is difficult to discern the wake from the variability in the surrounding flow field. How these wind streak features interact with a turbine wake is currently unknown.

Referring now to FIG. 11A, a plan view of the spectrum width gridded analysis at 80 m (hub height) along with gridded vertical cross sections upwind of and through the wake at various downwind D distances are shown in accordance with one embodiment of the present invention. The turbine is located at the origin, denoted by the magenta dot.

Figure 11B:
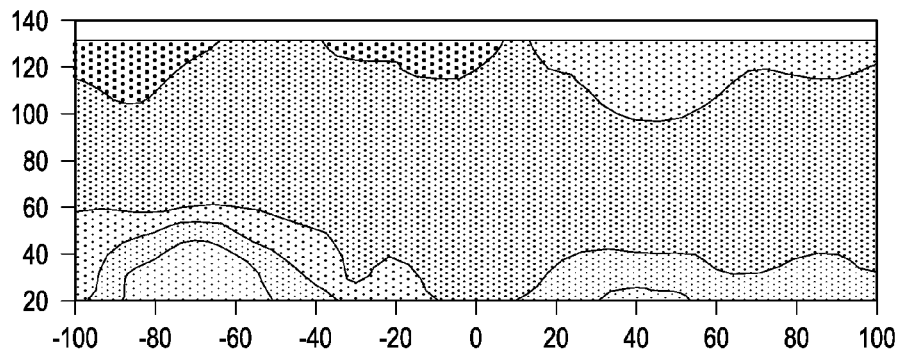
FIGS. 11B-11I shows various cross sections of FIG. 11A viewed from downwind looking back toward the turbine in accordance with one embodiment of the present invention.
Figure 11C:
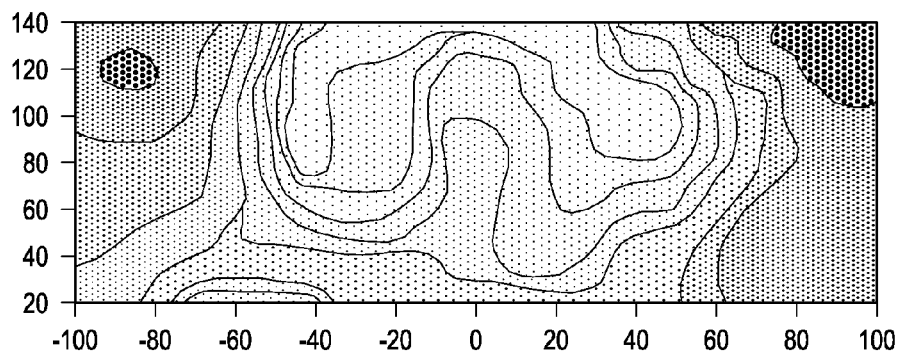
Figure 11D:
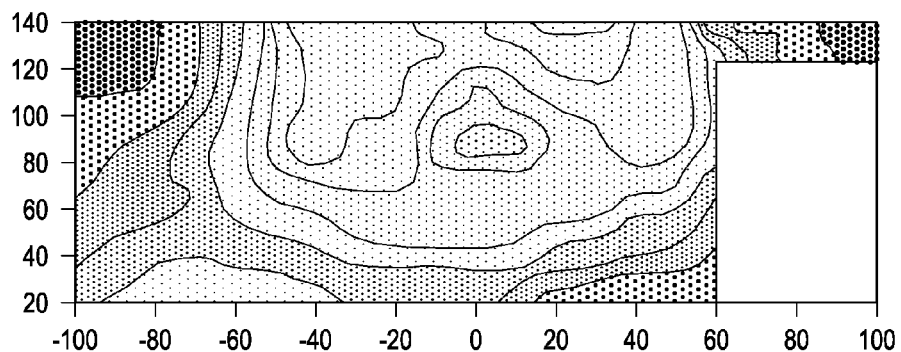
Figure 11E:
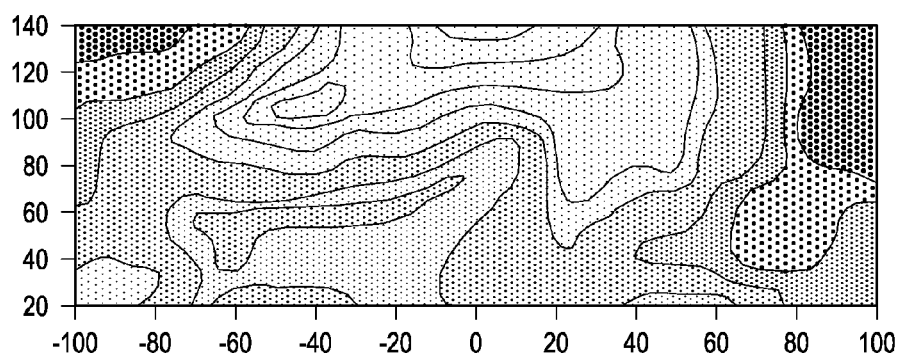
Figure 11F:
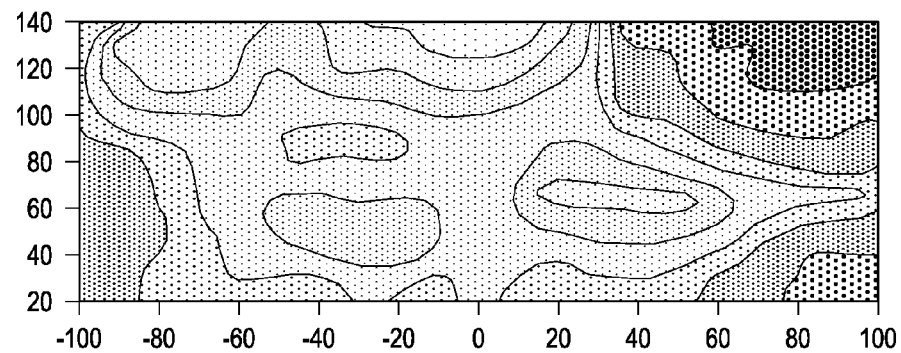
Figure 11G:
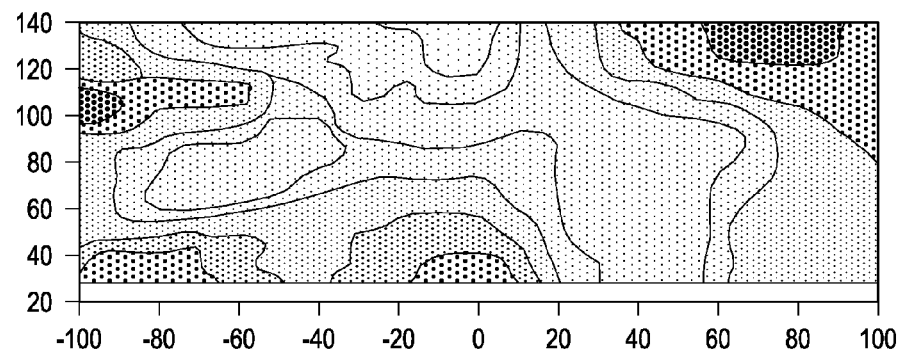
Figure 11H:
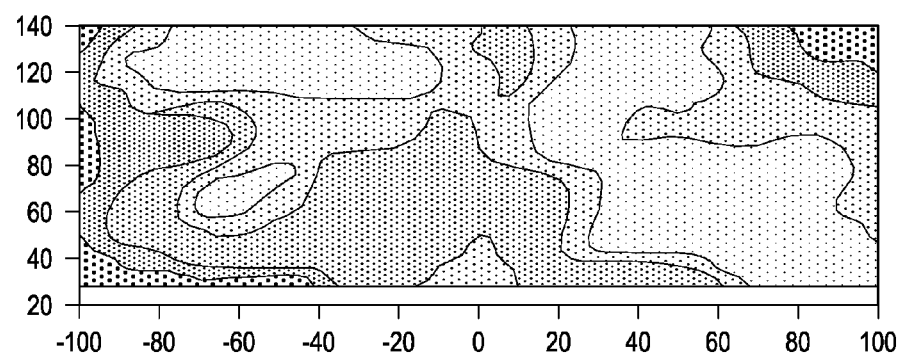
Figure 11I:
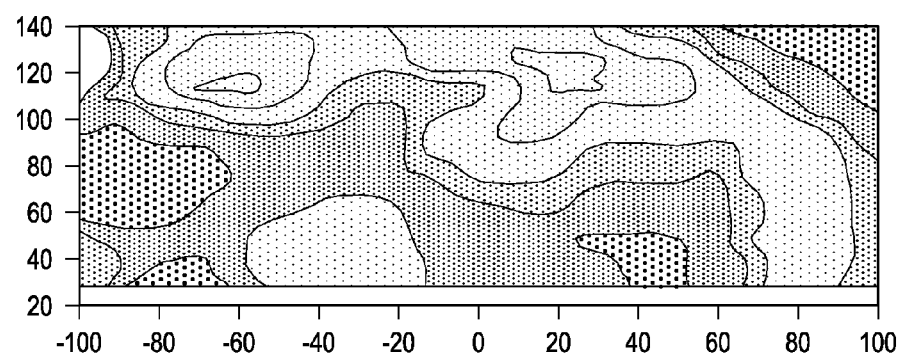
Figure 12:
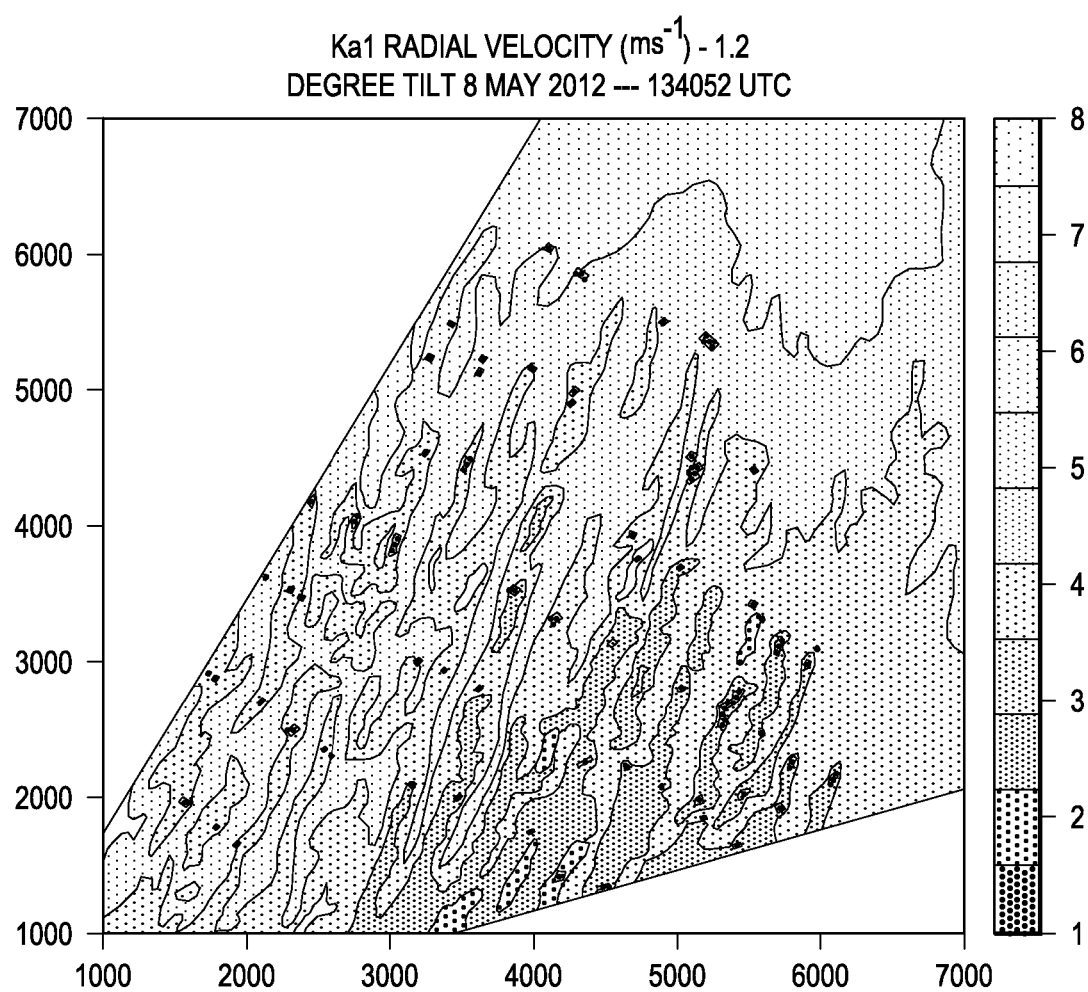
FIG. 12 shows a plan view of a single radial velocity sector using a 1.2° tilt in accordance with another embodiment of the present invention.

Now referring to FIGS. 11B-11I, various cross sections of FIG. 11A are viewed from downwind looking back toward the turbine in accordance with one embodiment of the present invention. The vertical cross sections oriented normal to the wake are shown at 1D upstream (FIG. 11B), 1D downstream (FIG. 11C), 2D downstream (FIG. 11D), 3D downstream (FIG. 11E), 5D downstream (FIG. 11F), 7D downstream (FIG. 11G), 10D downstream (FIG. 11H), and 15D downstream (FIG. 11I). Cross-section x axis is horizontal distance (m) and y axis is height (m). The color bar is shared for all panels. This analysis shows a ring of higher turbulence surrounding the hub, associated with the interface between the faster adjacent flow and the slower wake flow. The ring of spectrum width is consistent with the PPI and RHI analyses previously presented. This ring structure is traceable through about 5D, after which the wake turbulence is no longer as significant as mixing promotes the ring structure to collapse. [3] FIG. 12 shows a plan view of a single radial velocity sector using a 1.2° tilt within a wind farm in accordance with another embodiment of the present invention.

Figure 13:
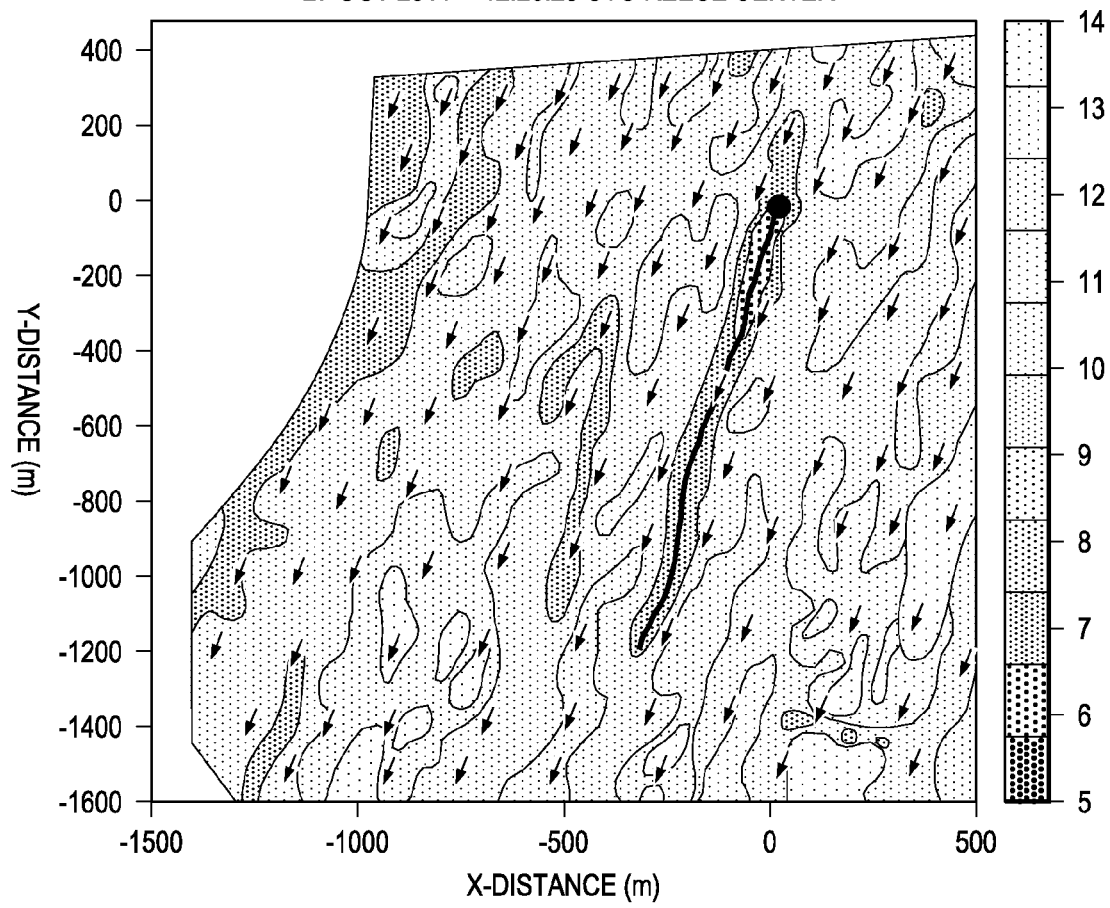
FIG. 13 shows the dual Doppler horizontal wind speed at 80 m AGL with a mean WD of 16.4° in accordance with one embodiment of the present invention.
Figure 14:
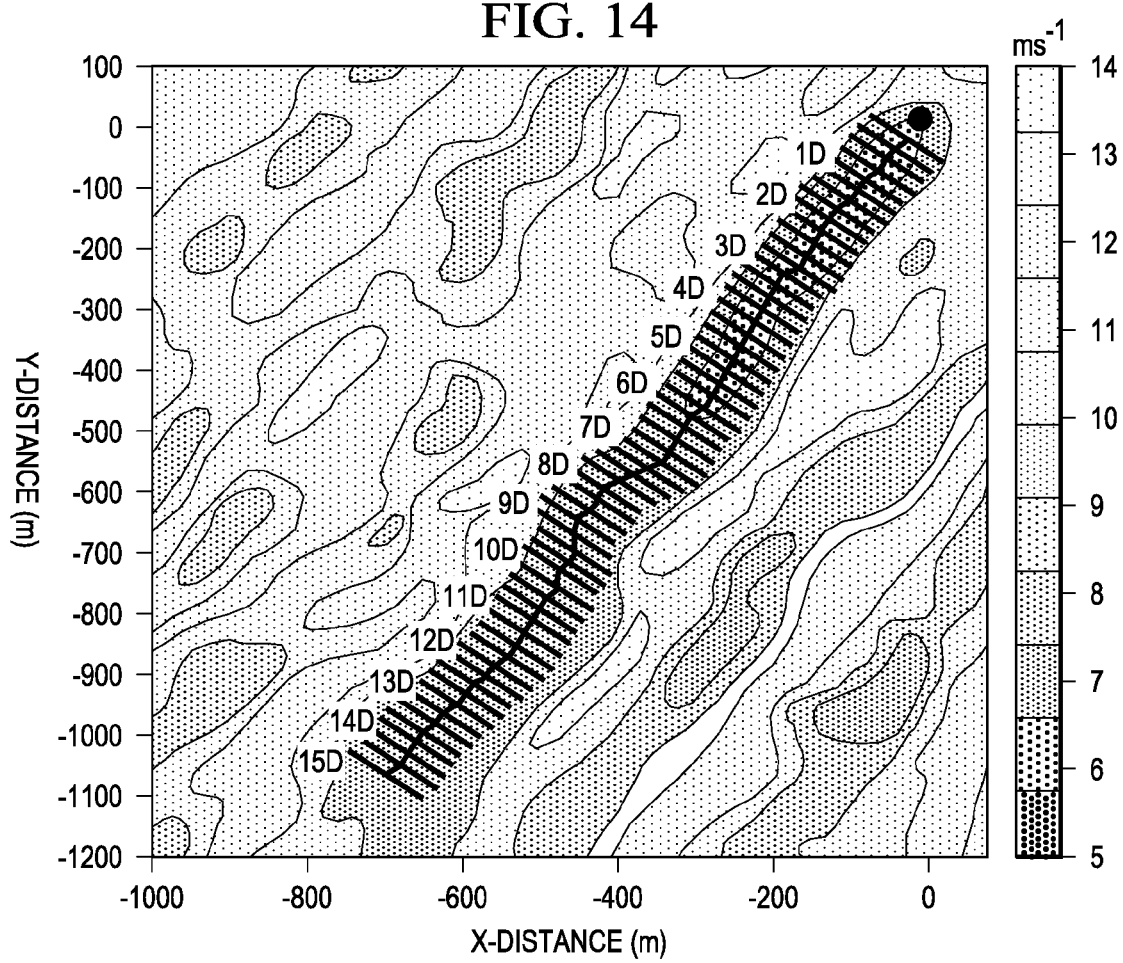
FIG. 14 shows the wind streaks and modulation of wake behavior in accordance with one embodiment of the present invention.

FIG. 13 shows the dual Doppler horizontal wind speed at 80 m AGL with a mean WD of 16.4°. The 54 minute period yielded 72 consecutive volumes. The complete grid used for this study was 3 km×3 km×150 m, with 10 m gird spacing in both the horizontal and vertical directions. Data were interpolated using the Barnes (exponential) weighting scheme with a radius of influence of 25 m in the horizontal direction and 15 m in the vertical direction. The REORDER Barnes weighting function was set to −2.3. FIG. 14 shows the wind streaks and modulation of wake behavior.

Data collected from all 72 volumes are composited using a wake-relative orientation to assess the ensemble averaged wake structure as a deficit from the free-stream flow field. A mean free-stream wind profile is developed for each dual-Doppler volume by averaging a 1 km×1 km section of the dual-Doppler domain not impacted by the turbine wake. Using the algorithm determined wake center for each dual-Doppler volume, vertical cross-sections are developed through the wake at various downwind distances +/−50 m horizontally from the identified wake center. Vertical cross-sections from all 72 dual-Doppler volumes are then composited at each downwind increment. Each composited cross-section is presented as a percent reduction/deficit from the derived free-stream wind profile. FIGS. 15A-15F show vertical slices of the reduction (%) in horizontal wind speed within the wake composited from 72 dual-Doppler volumes at 1D (FIG. 15A), 2D (FIG. 15B), 5D (FIG. 15C), 7D (FIG. 15D), 10D (FIG. 15E), and 12D (FIG. 15F) downwind in accordance with the present invention. Domain grid points are shown, and magenta grid points represent those contained by the wake-relevant rotor sweep (solid black circle). The black plus sign represents the center of the turbine hub. The maximum and mean reduction values from the contributing rotor sweep grid points are annotated.

Using the grid points contained within the wake-relevant rotor sweep (black circle), a mean and maximum wind speed deficit (i.e., reduction in wind speed relative to the free-stream) is assessed for each downwind composite cross-section. The mean (maximum) wind speed deficit within the wake at 1D is 27.7% (38.5%), at 7 D is 17.4% (23.5%), at 10 D is 14.8% (19.1%), and at 15 D is 11.5% (15.5%). For the first 10D of distance immediately downwind of the turbine, the difference between the maximum and mean wind speed deficit converges with increasing distance and is 10.8% at 1D, 6.1% at 7 D, and 4.3% at 10 D. For downwind distances beyond 10 D, this difference changes little, and is 4.0% at 15 D (FIG. 16) as mixing and entrainment reduce the peak wake deficits. The higher wind speed reductions associated with the wake are stretched upward in the gridded data fields, particularly where the reductions are most significant. This upward stretching is due to a lack of data above the 120 m level, such that larger deficit values are interpolated upwards during the coordinate space conversion process. This effect does not have a significant impact on the constructed analysis, and is estimated to induce a positive bias to the mean wind speed reduction behind the rotor sweep of no more than 0.5%.

The analyzed wind speed deficits in the wake are linked to the potential power deficits that a downwind turbine located within the wake might experience. To explore this impact, we focus on the mean wind speed deficit values within the wake-relevant rotor sweep. Within region two of a power curve, power output is proportional to the inflow mean wind speed cubed. Note that the coefficient of power for the turbine studied was not available for use. All calculated power reductions are considered to be estimates that assume a constant coefficient of power across the range of documented wind speeds but are still believed to provide meaningful perspective. For example, at a downwind distance of 2 D, the composite mean wind speed reduction behind the rotor sweep is 27.3% relative to the free stream flow. The wind speed reduction corresponds to a potential power reduction for a turbine centered within this wake of 61.6% relative to the power output from a turbine experiencing the free stream flow. At a downwind distance of 7 D, the composite mean wind speed reduction is 17.4%, corresponding to a 43.6% decrease in potential power output. At 10 D downwind, the composite mean wind speed reduction is 14.8%, which is proportional to a potential decrease in power output of 38.2%. At 15 D, a mean wind speed reduction of 11.5% is observed, which yields a 30.6% decrease in potential power output. It is important to note that the turbulent character of the wake can vary significantly with downwind distance, which can affect the relationship between wind speed and power output.

These initial results agree well with independent analyses using Supervisory Control and Data Acquisition (SCADA) data collected at the Middelgrunden offshore wind farm in Denmark. This study compared data collected from the nacelles of a leading turbine and another turbine located 2.4 D downwind. For a well-aligned wind direction, the SCADA data showed a wind speed reduction within the wake center of roughly 30% at the location of the downwind turbine. Similar analysis from SCADA data at the Horns Rev offshore wind farm in Denmark showed a decrease in normalized power output of roughly 38% between a leading row turbine, and a turbine located 7 D downwind for a well aligned wind direction. Meteorological tower data collected over a 5-yr period at the Energy Research Center of the Netherlands Wind Turbine Test Site in Wieringermeer showed maximum velocity deficits within a wake to be 45% at 2.5 D and 35% at 3.5 D. Maximum power loss between the first turbine and the second turbine (separated by 3.8 D) reached 67%. Although there are differences in turbine specifications, surface roughness, and atmospheric conditions associated with data collected from these previous studies and the single turbine examined herein, similar findings are shown using vastly different analysis methods.

Figure 16:
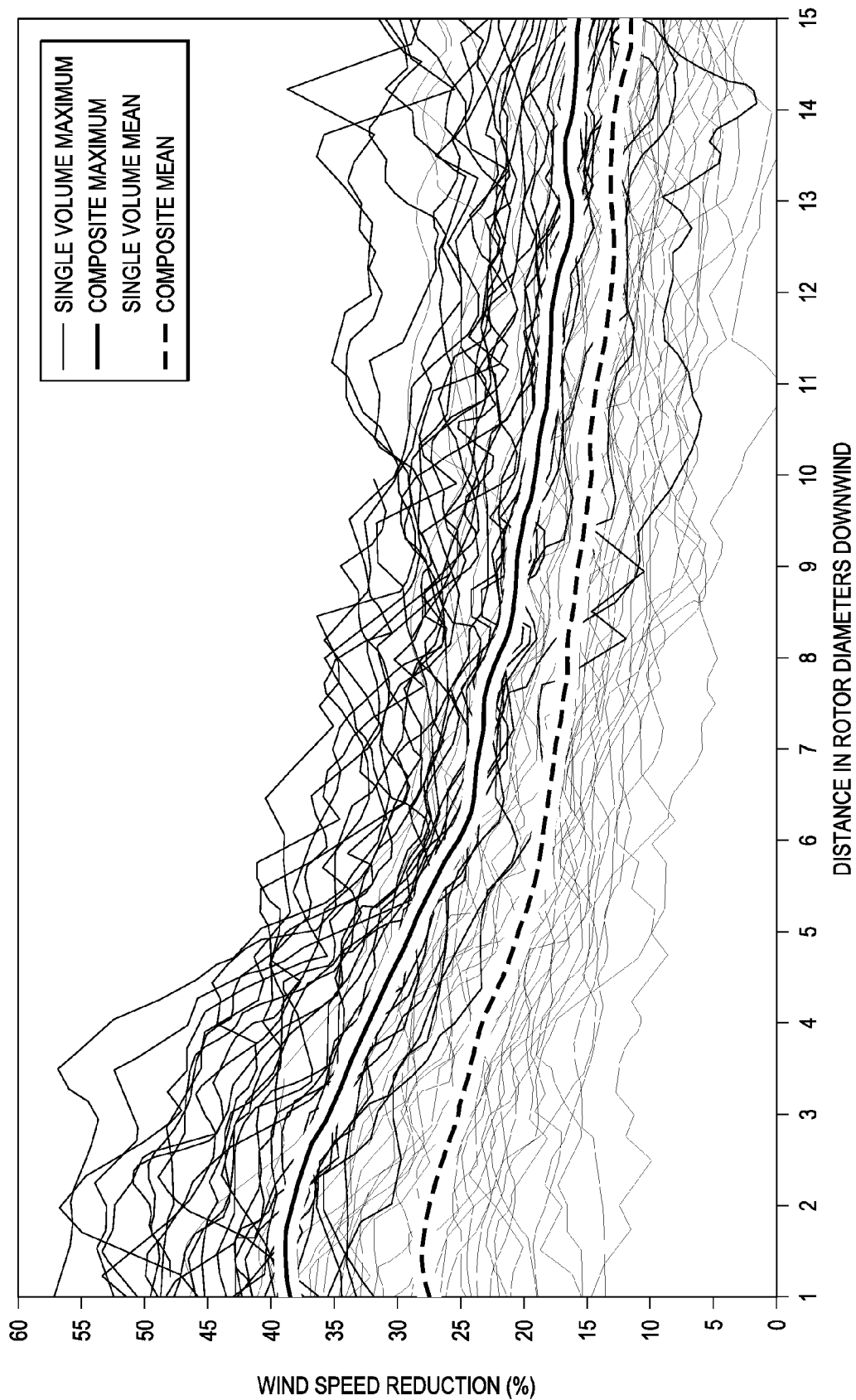
FIG. 16 shows horizontal wind speed reductions (%) within the wake at various downwind distances from the turbine relative to the free-stream flow field in accordance with one embodiment of the present invention.

Now referring to FIG. 16, horizontal wind speed reductions (%) within the wake at various downwind distances from the turbine relative to the free-stream flow field in accordance with the present invention are shown. Thin lines represent individual volume maximum and mean values. Bold lines indicate maximum and mean reduction composites from all 72 contributing dual-Doppler volumes. The collected data also reveal considerable variability between individual dual-Doppler synthesized deficits of horizontal wind speed within the wake. Maximum wind speed reductions in the wake within 4 D of the turbine exceeded 50% on several occasions during the collection period. At 2 D, the range in mean wind speed reduction behind the rotor sweep over the 72 contributing volumes is 32%. The spread reduces at 6 D to 20%. At 14 D, the spread increases again to 31%, which is speculated to be attributed to the effect of wake meandering. The mean range for all calculated downwind distances from 1 to 15 D is 26%. The net result to a downwind turbine could be a large variability in potential power output on very short time scales (within minutes).

Figure 17A:
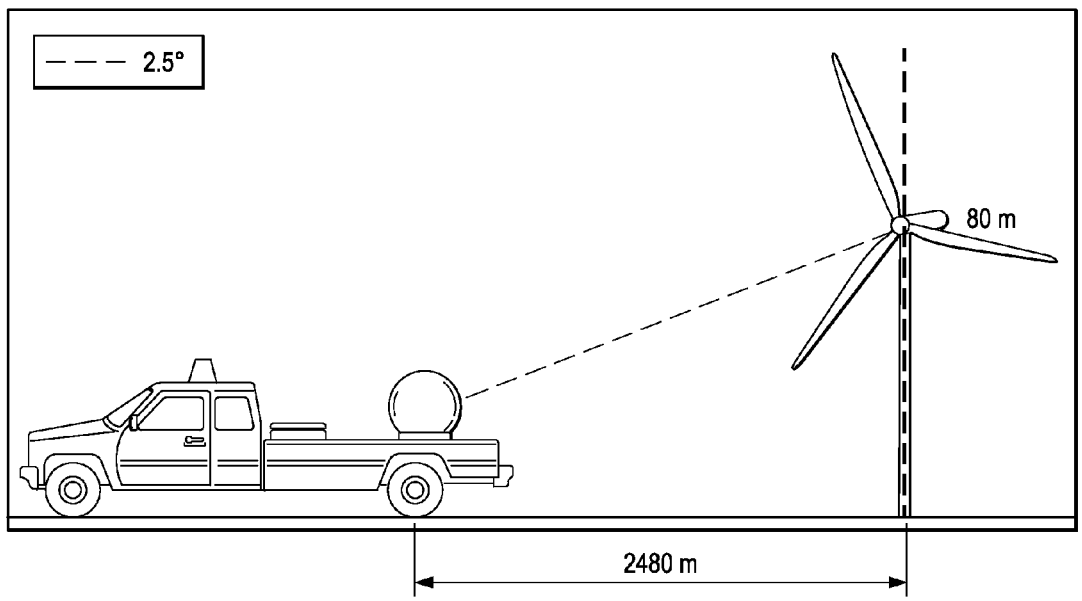
FIGS. 17A and 17B are various views of a Doppler radar deployment in which a single radar (TTUKa2) was used document the structure and evolution of a single utility-scale turbine wake on Jan. 9, 2013 in accordance with one embodiment of the present invention.
Figure 17B:
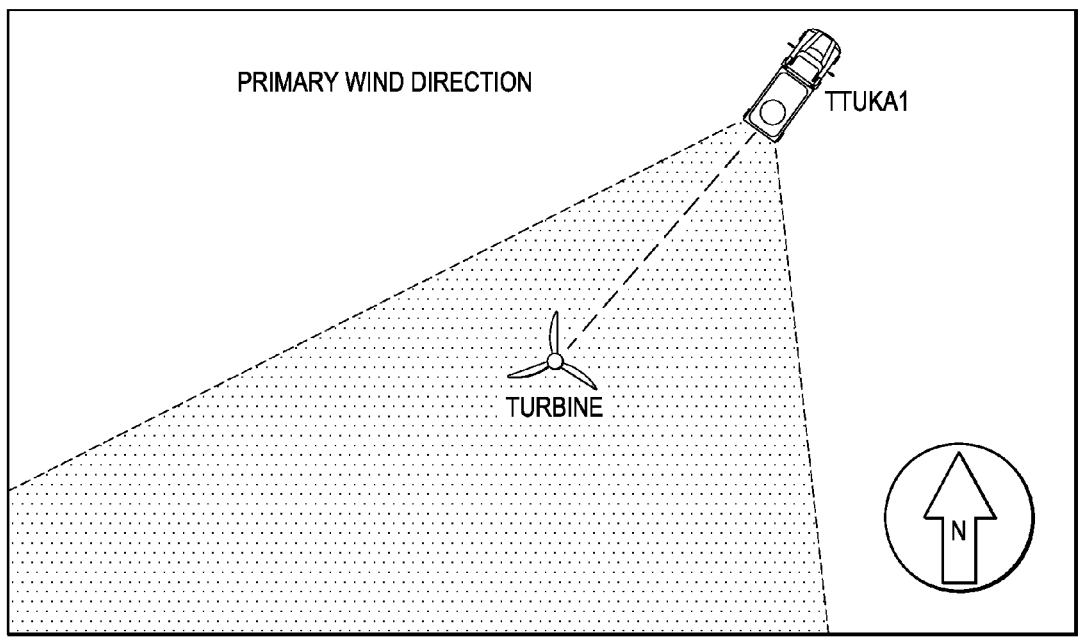
Figure 18:
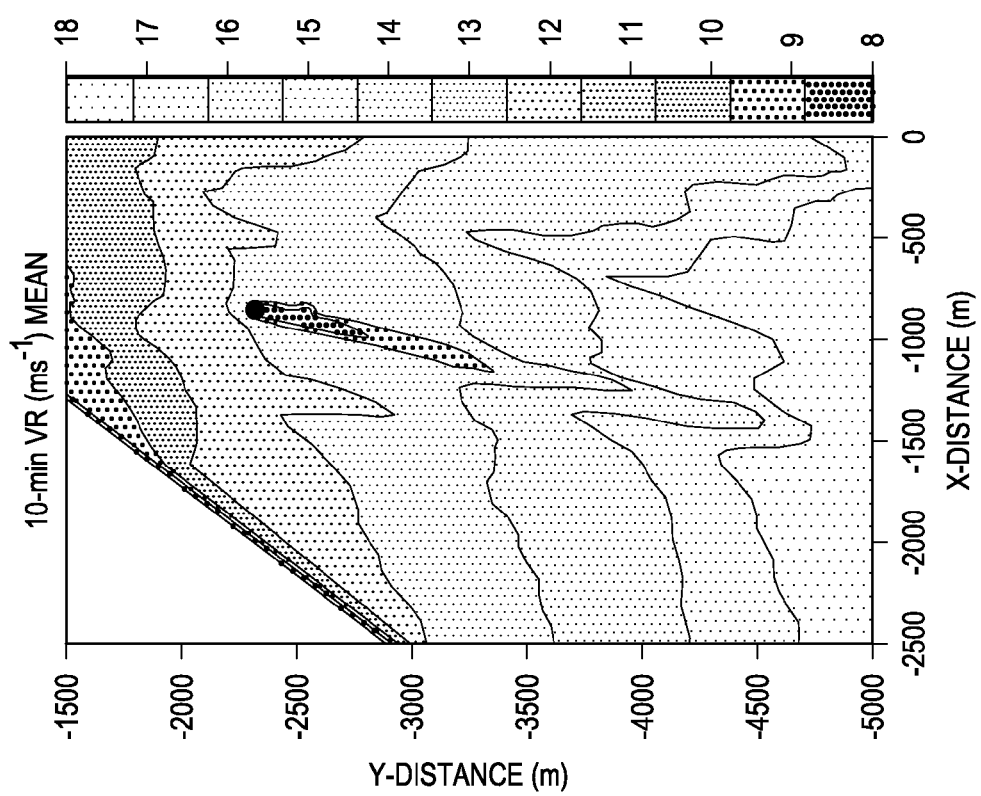
FIG. 18 shows the radial velocity at 1.8° in accordance with one embodiment of the present invention.
Figure 19:
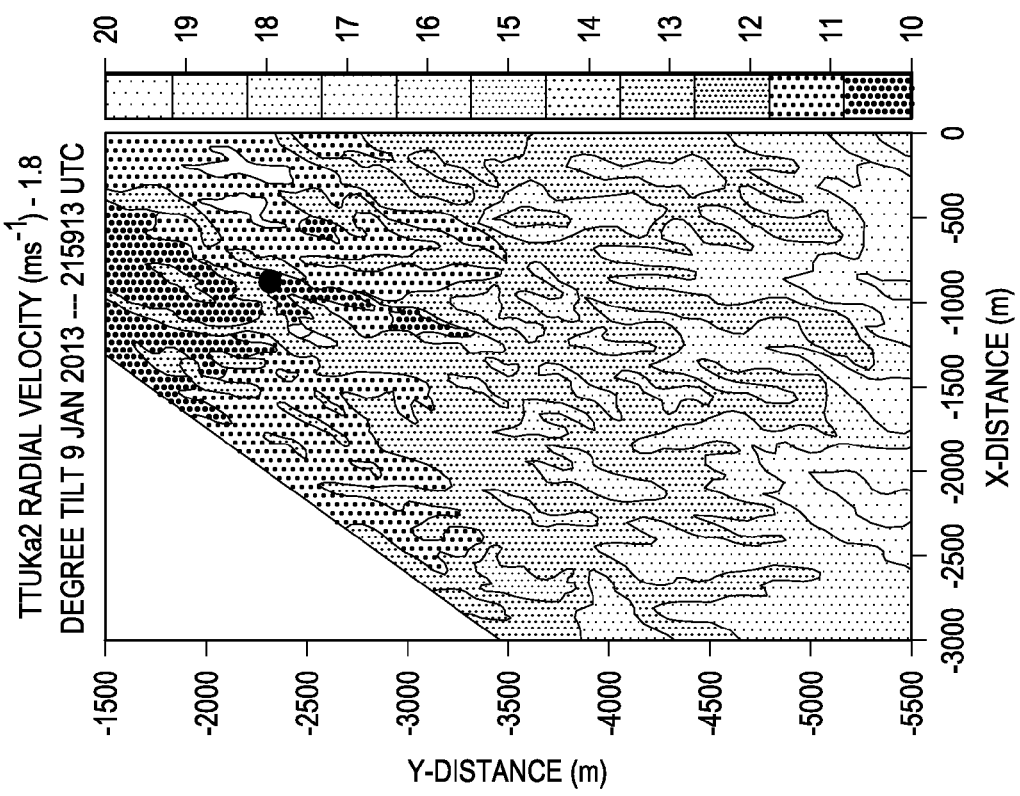
FIG. 19 shows the 10 minute VR mean in accordance with one embodiment of the present invention.
Figure 20:
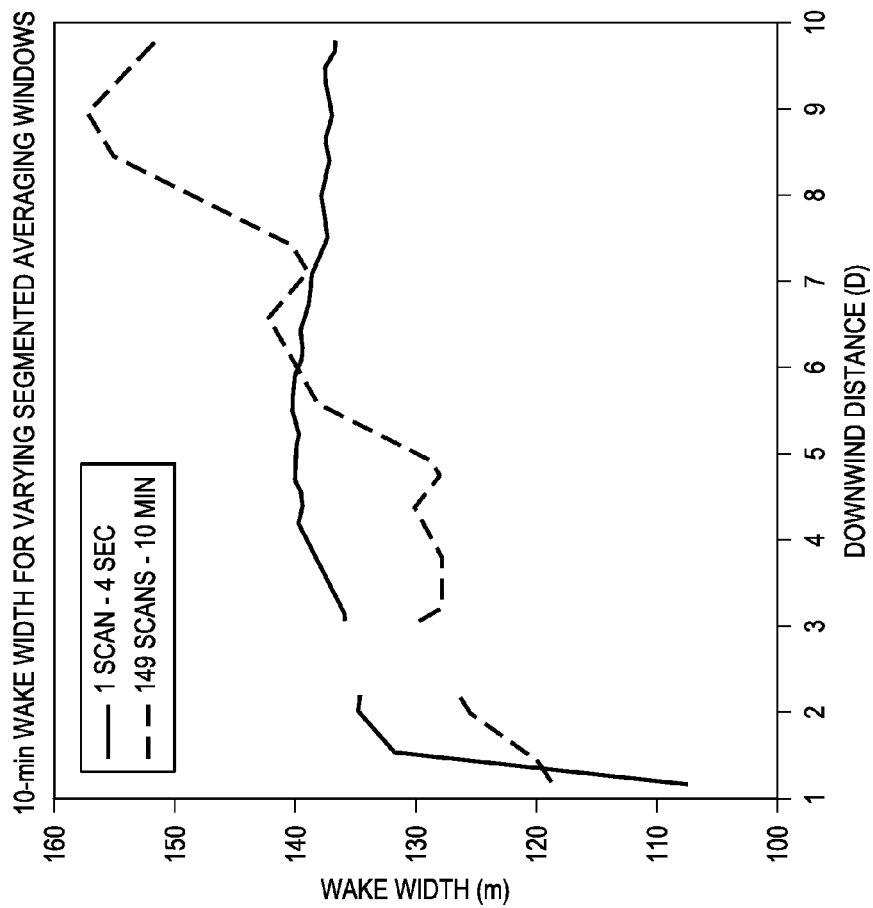
FIG. 20 shows an assessment of the wake width and meandering (150 scans over 10 minutes) in accordance with one embodiment of the present invention.
Figure 21:
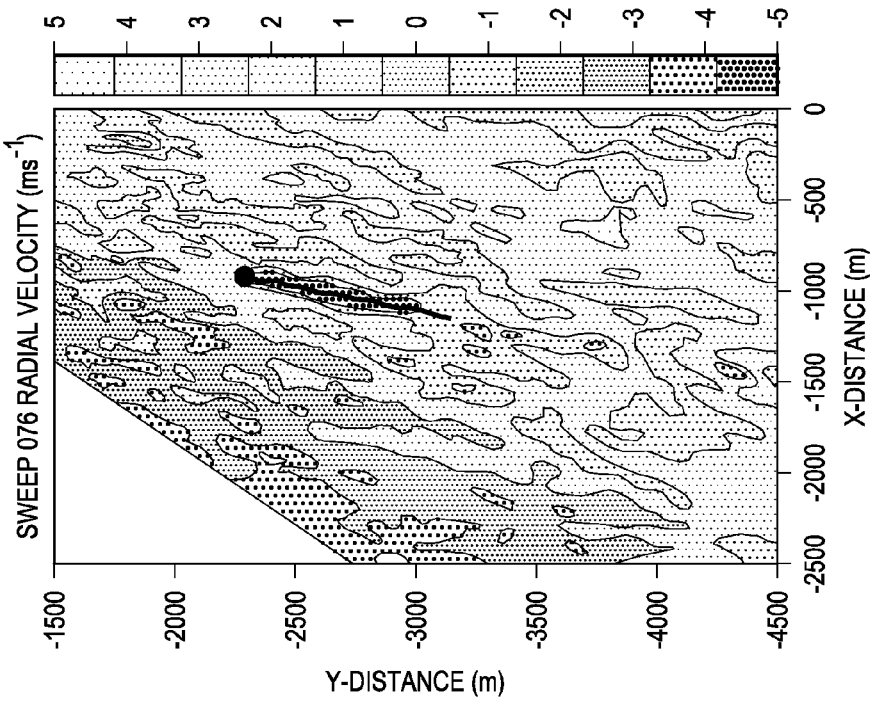
FIG. 21 shows a graph assessing wake width and meandering for 1 scan (4 s) and 149 scans (10 min) in accordance with one embodiment of the present invention.

Referring now to FIGS. 17A and 17B are various views of a Doppler radar deployment in which a single radar (TTUKa2) was used document the structure and evolution of a single utility-scale turbine wake on Jan. 9, 2013. A pulse length of 12.5 ms was used along with a pulse repetition frequency of 12,000 Hz, yielding a maximum range of 15 km. Repetitive 45° PPI sector scans were collected (500 scans over 34 minutes). The turbine hub height was 80 m and the turbine rotor diameter was 86 m. TTUKa2 was positioned at a distance of 2480 m north-northeast of the turbine. At this bearing, the turbine was oriented closely parallel to the mean wind direction (from the north through northeast) downwind of TTUKa2. TTUKa2 performed sector scans at an elevation angle of 1.8°. The sector revisit time was 4.1 s. FIG. 18 shows the radial velocity at 1.8°. FIG. 19 shows the 10 minute VR mean. FIG. 20 shows an assessment of the wake width and meandering (150 scans over 10 minutes). FIG. 21 shows a graph assessing wake width and meandering for 1 scan (4 s) and 149 scans (10 min).

Figure 22:
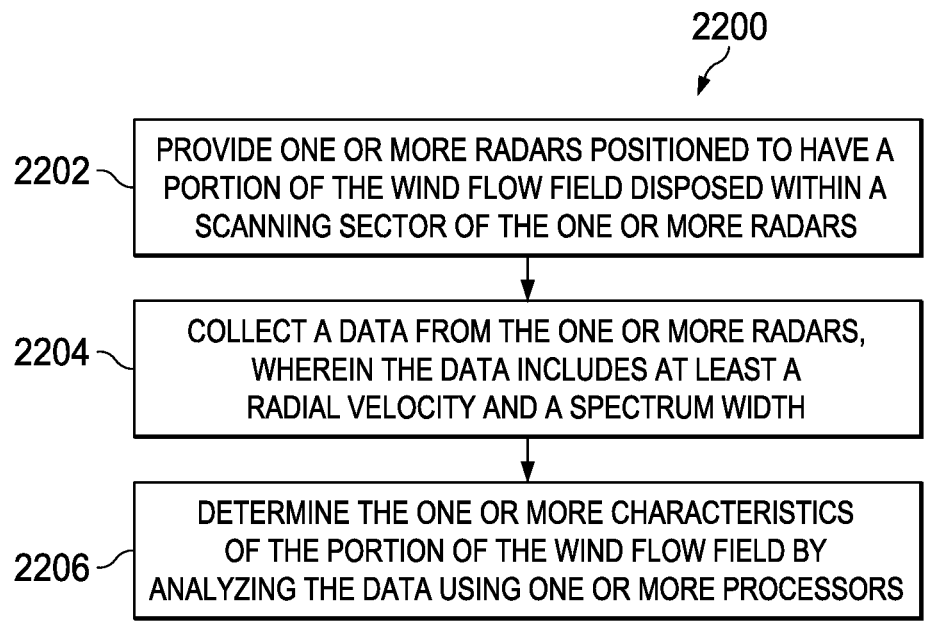
FIG. 22 is a flow chart of a method for obtaining data to determine one or more characteristics of a wake of one or more turbines in accordance with one embodiment of the present invention.

Referring now to FIG. 22, a flow chart for a method 2200 for obtaining data to determine one or more characteristics of a wind flow field in accordance with the present invention is shown. One or more radars are positioned to have a portion of the wind flow field (e.g., one or more locations of interest) disposed within a scanning sector of the one or more radars in block 2202. A data is collected from the one or more radars in block 2204. The data includes at least a radial velocity and a spectrum width. One or more characteristics of the portion of the wind flow field are determined by analyzing the data using one or more processors in block 2206. The one or more characteristics may include the mean and variable structure of the portion of the wind flow field, locating and tracking enhanced turbulence within the portion of the wind flow field, a plurality of center points for one or more turbine wake(s), a length of the one or more turbine wake(s), a set of horizontal wind speed deficits or surpluses within the portion of the wind flow field relative to a free-stream flow, a forecast power output for one or more turbines within the portion of the wind flow field, recognition of a localized event of interest (e.g., thunderstorm outflow) which may contain significant changes in wind speed and/or direction, information about the vertical profile of horizontal wind speed and direction within the wind flow field, or a combination thereof.

The one or more radars can be one or more Doppler radars or other suitable types of radar technologies. These permutations include the use of fixed and mobile platforms, the use of different transmitters (e.g., magnetron, klystron, traveling wave tubes, etc.) and receiver technologies (e.g., different amplifiers and filters) concepts, the use of different wavelengths of radiation, the use of different processors, the use of different hardware components (e.g., antennas, pedestals, etc.), and/or the ability to provide or not provide pulse compression technologies. For example, suitable microwave frequency bands include: W-band (75 to 110 GHz); V-band (50 to 75 GHz); Ka-band (26.5 to 40 GHz); K-band (18 to 26.5 GHz); Ku-band (12 to 18 GHz); X-band (8 to 12 GHz); C-band (4 to 8 GHz); and S-band (2 to 4 GHz). Note that fixed radars will typically be installed at a height approximately equal to or near hub height of the wind turbines within and adjacent to the portion of the wind flow field of interest. The radar network can also have multiple nodes. Multiple tilt angles can be used to determine what is happening vertically above the hub of the wind turbines. The radar can be set for continuous scanning, "on-demand" scanning, scanning at predefined time periods, scanning upon occurrence of a trigger event, or other desired operational mode.

The scanning range of the present invention is not limited to any sector. For example, the scanning sector can be a full 360 degrees. Furthermore, one or more additional radars can be positioned to have the portion of the wind flow field or another portion of the wind flow field within an additional scanning sector for the additional radars. For example, multiple radars can be positioned such that they have scanning sectors that progressively overlap one another (i.e., "leap frog" one another). In other words, a second scanning sector overlaps a portion of first scanning sector, a third scanning overlaps a portion of the second scanning sector and may or may not include a portion of the first scanning sector, a fourth scanning sector overlaps a portion of the third scanning sector and may or may not include a portion of the first or second scanning sectors, and so on. The only limitation on the size of the portion of the wind flow field is that the return signals have to be coherent enough to obtain usable data. Note also that an individual radar can be positioned upstream or downstream or both from the portion of the wind flow field being analyzed.

The step of collecting the data from the one or more radars may include the steps of collecting a raw data from the one or more radars, and processing the raw data to generate a data. The step of processing the raw data may include various conversion and interpolation processes.

Additional steps may include compositing the data using a wake-relative orientation to assess an ensemble averaged wake structure as a deficit from a free-stream radial velocity field or developing a mean free-stream radial velocity profile by averaging a section of the data not impacted by a wake of one or more turbines. Other steps may include accessing variability about the mean, developing a plurality of vertical cross-sections through a wake of one or more turbines at various distances downwind from the one or more turbines, compositing the vertical cross-sections at each distance downwind from the one or more turbines, and presenting each composited vertical cross-section as a percent reduction/deficit from a derived free-stream radial velocity profile. An estimate of the wind speed deficit may also be assessed for each downwind composite cross-section.

Figure 23:
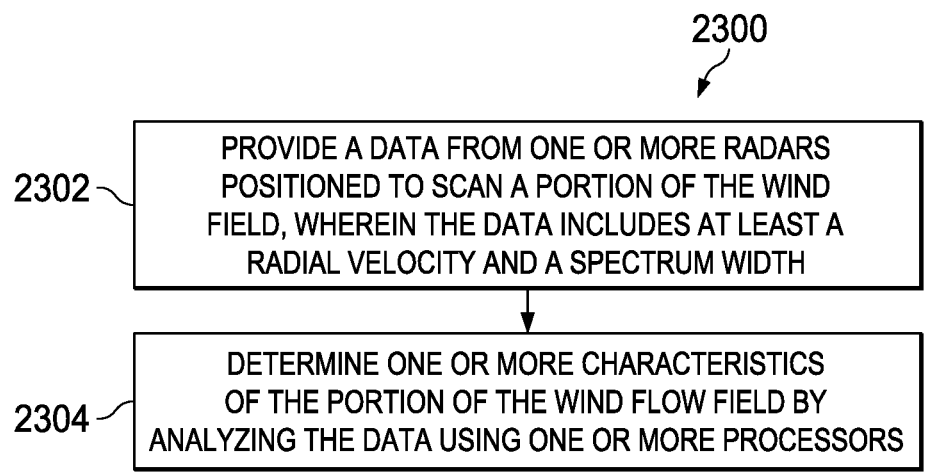
FIG. 23 is a flow chart for a method for determining one or more characteristics of a wake of one or more turbines in accordance with the present invention.

Now referring to FIG. 23, a flow chart for a method 2300 for determining one or more characteristics of a wind flow field in accordance with the present invention is shown. A data is provided from one or more radars positioned to scan a portion of the wind flow field in block 2302. The data includes at least a radial velocity and a spectrum width. The one or more characteristics of the portion of the wind flow field are determined by analyzing the data using one or more processors in block 2304.

Note that the conversion of the radar data through different data translations and the subsequent processes described herein will vary depending on the equipment being used and the objective of the project. As a result, the present invention is not limited to the specific conversion, calculation and processing methods described herein. Custom applications may be coded to allow for enhanced performance.

Various scales must be considered when investigating turbine wake structure, ranging from small blade tip vortices to broad wake widening and meandering as a function of surrounding atmospheric conditions and wind turbine and farm design. As observational capabilities improve, the ability to observe the full spectrum of wake scales will help validate numerical simulations, ultimately providing better power output forecasts. The TTUKa mobile radar systems are well equipped to explore the full length of turbine wakes, including wake width expansion, wake meandering, lateral wake merging [2], and wind farm to wind farm interaction with range resolution and coverage that exceeds current LIDAR technologies. Various techniques can be used to analyze this and other TTUKa wake datasets. Composites of several long-duration PPI and RHI scan periods can be constructed to assess mean wake structure using mean radial velocity deficit and mean spectrum width signatures. At greater D, the magnitude and frequency of wake meandering can be analyzed.

The present invention provides comprehensive information about the modulated flows within a wind field or farm. These technologies and techniques will enhance wind farm design, layout practices and operation. Documenting the structure and evolution of complex flows within and surrounding wind farms will lead to increased efficiency as turbine wakes are fully characterized, turbine-to-turbine interactions are defined, transient wind events are proactively identified, the effects of local terrain are documented, and turbine inflows are adequately characterized allowing intelligent control of individual wind turbines and entire wind farms.

Utilizing adaptive scanning strategies, the variability of the flow surrounding a turbine can be documented in real time. Individual turbine wakes can be tracked at multiple downstream locations both in the horizontal and vertical dimensions. Inflow-relative radial velocity reductions can be constructed across the rotor sweep, along with power output deficits for a hypothetical downstream turbine located within the wake. These same principles also can be expanded to multiple turbines in a wind farm setting where turbine-to-turbine interactions exist.

Integration of these technologies and techniques will lead to "smarter" wind farms by improving individual turbine and wind farm awareness and efficiency. The deployment of multiple radars can document the modulated wind flow field of an entire wind farm, leading to an advanced controls opportunity to optimize the wind farm for enhanced performance and loads mitigation, reducing the cost of energy. Moreover the data derived from such measurements can be used to model wind farms and provide optimized wind turbine layouts for new turbines or new wind farms.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

REFERENCES

1. R. J. Barthelmie, and Coauthors, 2009: Modelling and measuring flow and wind turbine wakes in large wind farms offshore. *Wind Energy*, 12, 431-444.
2. R. J. Barthelmie, and Coauthors, 2010: Quantifying the impact of wind turbine wakes on power output and offshore wind farms. *J. Atmos. Oceanic Technol.*, 27, 1302-1317.
3. B. Sanderse, S. P. van der Pijl, and B. Koren, 2011: Review of computational fluid dynamics for wind turbine wake aerodynamics. *Wind Energy*, 14, 799-819.
4. Y. L. Pichugina, and Coauthors, 2011: Wind turbine wake study by the NOAA high-resolution Doppler LIDAR. *Proc. 16th Coherent Laser Radar Conf.*, Long Beach, Calif.
5. C. J. Grund, R. M. Banta, J. L. George, J. N. Howell, M. J. Post, R. A. Richter, and A. M. Weickmann, 2001: High-resolution Doppler LIDAR for boundary layer and cloud research. *J. Atmos. Oceanic Technol.*, 18, 376-393.
6. Y. Kasler, S. Rahm, R. Simmet, and M. Kuhn, 2010: Wake measurements of a multi-MW wind turbine with coherent long range pulsed Doppler wind LIDAR. *J. Atmos. Oceanic Technol.*, 27, 1529-1532.
7. C. C. Weiss, J. L. Schroeder, J. Guynes, P. S. Skinner, and J. Beck, 2009: The TTUKa mobile Doppler radar: Coordinated radar and in situ measurements of supercell thunderstorms during Project VORTEX2. *Proc. 34th Conf on Radar Meteorology*, Williamsburg, Va., Amer. Meteor. Soc. 11B 0.2. [Available online http://ams.confex.com/ams/34Radar/techprogram/paper 155425.htm.]
8. N. J. Vermeer, J. N. Sørensen, and A. Crespo, 2003: Wind turbine wake aerodynamics. *Prog. Aerosp. Sci.*, 39, 467-510.

OTHER REFERENCES

1. R. J. Barthelmie, S. T. Frandsen, M. N. Nielsen, S. C. Pryor, P. E. Rethore, and H. E. Jorgensen, 2007: Modelling and measurements of power losses and turbulence intensity in wind turbine wakes at Middelgrunden offshore wind farm. *Wind Energy*, 10, 517-528.
2. R. J. Barthelmie, and L. E. Jensen, 2010: Evaluation of wind farm efficiency and wind turbine wakes at the Nysted offshore wind farm. *Wind Energy*, 13, 573-586.
3. A. Crespo, J. Hernandez, and S. Frandsen, 1999: Survey of modeling methods for wind turbine wakes and wind farms. *Wind Energy*, 2, 1-24.
4. N. Troldborg, G. C. Larsen, H. A. Madsen, K. S. Hansen, J. N. Sørensen, and R. Mikkelsen, 2011: Numerical simulations of wake interaction between two wind turbines at various inflow conditions. *Wind Energy*, 14, 859-876
5. J. S. Gonzalez A. G. G. Rodriguez, J. C. Mora, J. R. Santos, and M. B. Payan, 2010: Optimization of wind farm turbines layout using an evolutive algorithm. *Renewable Energy*, 35, 1671-1681.
6. A. Kusiak, and Z. Song, 2010: Design of wind farm layout for maximum wind energy capture. *Renewable Energy*, 35, 685-694.
7. T. Knudsen, T. Bak, and M. Soltani, 2011: Prediction models for wind speed at turbine locations in a wind farm. *Wind Energy*, 14, 877-894.

8. J. Meyers, and C. Meneveau, 2012: Optimal turbine spacing in fully developed wind farm boundary layers. *Wind Energy*, 15, 305-317.
9. S. Chowdhury, J. Zhang, A. Messac, and L. Castillo, 2012: Unrestricted wind farm layout optimization (UW-FLO): Investigating key factors influencing the maximum power generation. *Renewable Energy*, 38, 16-30.
10. G. C. Larsen, H. A. Madsen, K. Thomsen, and T. J. Larsen, 2008: Wake meandering: A pragmatic approach. *Wind Energy*, 11, 377-395.
11. G. Espana, S. Aubrun, S. Loyer, and P. Devinant, 2011: Spatial study of the wake meandering using modelled wind turbines in a wind tunnel. *Wind Energy*, 14, 923-937.
12. B. D. Hirth, J. L. Schroeder, W. S. Gunter, and J. G. Guynes, 2012: Measuring a utility-scale turbine wake using the TTUKa mobile research radars. *J. Atmos. Oceanic Technol.*, 29, 766-771.
13. F. Bingöl, J. Mann, and G. Larsen, 2010: Light detection and ranging measurements of wake dynamics. Part I: One-dimensional scanning *Wind Energy*, 13, 51-61.
14. J. Trujillo, F. Bingol, G. C. Larsen, J. Mann, and M. Kuhn, 2011: Light detection and ranging measurements of wake dynamics. Part II: Two-dimensional scanning. *Wind Energy*, 14, 61-75.
15. E. C. Farnett, and G. H. Stevens, 1990: Pulse compression radar. *Radar Handbook*, M. I. Skolnik, Ed., McGraw-Hill, 10.1-10.39.
16. F. O'Hora, and J. Bech, 2007: Improving weather radar observations using pulse-compression techniques. *Meteor. Appl.*, 14, 389-401.
17. S. Khanna, J. G. Brasseur, *J. Atmos. Sci.* 55, 710 (1998).
18. G. S. Young, D. A. R. Kristovich, M. R. Hjelmfelt, and R. C. Foster, 2002: Rolls, streets, waves, and more: A review of quasi-two-dimensional structures in the atmospheric boundary layer. *Bull. Amer. Meteor. Soc.*, 83, 997-1001.
19. P. Drobinski, and R. C. Foster, 2003: On the origin of near-surface streaks in the neutrally-stratified planentary boundary layer. *Bound.-Layer Meteor.*, 108, 247-256.
20. M. Hansen, 2000: Aerodynamics of Wind Turbines. James and James, 144 pp.
21. S. L. Barnes, 1964: A technique for maximizing details in numerical weather map analysis. *J. Appl. Meteor.*, 3, 396-409.
22. J. G. Schepers, T. S. Obdam, and J. Prospathopoulos, 2012: Analysis of wake measurements from the ECN Wind turbine Test Site Wieringermeer, EWTW. *Wind Energy*, 15, 575-591.
23. G. C. Larsen, and Coauthors, 2007: Dynamic wake meandering modeling. Riso Rep. Risø-R-1607(EN), 83 pp.
24. R. J. Barthelmie, S. C. Pryor., 2013: An overview of data for wake model evaluation in the Virtual Wakes Laboratory. *Appl. Energy*, 104: 834-844.
25. P. McKay, R. Carriveau, D. S. Ting., 2013: Wake impacts on downstream wind turbine performance and yaw alignment. *Wind Energy*, 16; 221-234.
26. M. Gaumond, and Coauthors, 2013: Evaluation of the wind direction uncertainty and its impact on wake modelling at the Horns Rev offshore wind farm. *Wind Energy*, in press.
27. E. S. Politi, and Coauthors, 2012: Modeling wake effects in large wind farms in complex terrain: the problem, the methods and the issues. *Wind Energy*, 15: 161-182.
28. G. V. Iungo, Y. Wu, F. Porté-Agel, 2013: Field measurements of wind turbine wakes with lidars. *J. Atmos. Oceanic Technol.*, 30: 274-287.
29. I. N. Smalikho, and Coauthors, 2013: Lidar investigation of atmosphere effect on a wind turbine wake. *J. Atmos. Oceanic. Technol.*, in press.
30. B. D. Hirth, J. L. Schroeder, 2013: Documenting wind speed and power deficits behind a utilityscale wind turbine. *J. Appl. Meteor. Climatol.*, 52: 39-52.
31. S. Wharton, J. K. Lundquist, 2013: Assessing atmospheric stability and its impacts on rotor-disk wind characteristics at an onshore wind farm. *Wind Energy*, 15: 525-546.
32. P. Moriarty, T. Kogaki, 2007: Modeling of flow acceleration around wind farms. *Proc. 5$^{th}$ Joint Fluids Engineering Conf.*, San Diego, Calif.

What is claimed is:

1. A method for determining one or more characteristics of a complex wind flow field within or adjacent to a wind turbine or array of wind turbines using one or more radars, the method comprising the steps of:
providing the one or more radars positioned to have a portion of the complex wind flow field within or adjacent to the wind turbine or array of wind turbines disposed within a scanning sector of the one or more radars;
collecting data from the one or more radars, wherein the data comprises at least a radial velocity and a spectrum width; and
determining the one or more characteristics of the portion of the complex wind flow field within or adjacent to the wind turbine or array of wind turbines by analyzing the data using one or more processors, wherein the one or more characteristics comprise a plurality of center points and at least one vertical profile of wind speeds for one or more turbine wake(s).

2. The method as recited in claim 1, wherein the one or more characteristics comprise at least two characteristics which further comprise a mean and variable structure of the portion of the complex wind flow field, locating and tracking enhanced turbulence within the portion of the complex wind flow field, a length or width of the one or more turbine wake(s), a set of horizontal wind speed deficits within the portion of the complex wind flow field relative to a free-stream flow, a forecasted power output for one or more turbines within the portion of the complex wind flow field, recognition of a localized event of interest containing changes in wind speed and/or direction, a vertical profile of horizontal wind speeds and directions within the complex wind flow field, a shear across a turbine rotor sweep, a turbine wake deficit from inflow, a turbine wake orientation, a turbine wake evolution, a strength of high speed channels in between two or more turbine wakes, a turbine wake structure, transient wind gusts and lulls, or a combination thereof.

3. The method as recited in claim 1, wherein the one or more radars comprise one or more Doppler radars.

4. The method as recited in claim 1, wherein the one or more radars are mobile or fixed.

5. The method as recited in claim 1, wherein the one or more radars have a magnetron transmitter, a klystron transmitter or a traveling wave tube transmitter.

6. The method as recited in claim 1, wherein the one or more radars have a microwave frequency selected within the group of microwave frequency bands consisting essentially of W-band (75 to 110 GHz), V-band (50 to 75 GHz), Ka-band (26.5 to 40 GHz), K-band (18 to 26.5 GHz), Ku-band (12 to 18 GHz), X-band (8 to 12 GHz), C-band (4 to 8 GHz), and S-band (2 to 4 GHz).

7. The method as recited in claim 1, further comprising the step of providing one or more additional radars positioned to have the portion of the complex wind flow field or another portion of the complex wind flow field within an additional scanning sector for the additional radars.

8. The method as recited in claim 1, wherein the step of collecting the data from the one or more radars comprises the steps of:
collecting raw data from the one or more radars; and
processing the raw data to generate the data.

9. The method as recited in claim 1, further comprising the step of adjusting the data based on a beam misalignment with a true wind vector.

10. The method as recited in claim 1, wherein the data further comprises a vertical range-height indicator and a horizontal plan-position indicator.

11. The method as recited in claim 1, wherein the data further comprises interpolated horizontal wind flows describing a wake of one or more turbines and a free-stream radial velocity field surrounding the wake.

12. A method for determining one or more characteristics of a complex wind flow field within or adjacent to a wind turbine or array of wind turbines using one or more radars, the method comprising the steps of:
providing data from the one or more radars positioned to scan a portion of the complex wind flow field within or adjacent to the wind turbine or array of wind turbines, wherein the data comprises at least a radial velocity and a spectrum width; and
determining the one or more characteristics of the portion of the complex wind flow field within or adjacent to the wind turbine or array of wind turbines by analyzing the data using one or more processors, wherein the one or more characteristics comprise a plurality of center points and at least one vertical profile of wind speeds for one or more turbine wake(s).

13. The method as recited in claim 12, wherein the one or more characteristics comprise at least two characteristics which further comprise a mean and variable structure of the portion of the complex wind flow field, locating and tracking enhanced turbulence within the portion of the complex wind flow field, a length or width of the one or more turbine wake(s), a set of horizontal wind speed deficits within the portion of the complex wind flow field relative to a free-stream flow, a forecasted power output for one or more turbines within the portion of the complex wind flow field, recognition of a localized event of interest containing changes in wind speed and/or direction, a vertical profile of horizontal wind speeds and directions within the complex wind flow field, a shear across a turbine rotor sweep, a turbine wake deficit from inflow, a turbine wake orientation, a turbine wake evolution, a strength of high speed channels in between two or more turbine wakes, a turbine wake structure, transient wind gusts and lulls, or a combination thereof.

14. The method as recited in claim 12, wherein the one or more radars are positioned to have the portion of the complex wind flow field disposed within a scanning sector of the one or more radars.

15. The method as recited in claim 12, wherein the one or more radars comprise one or more Doppler radars.

16. The method as recited in claim 12, wherein the one or more radars are mobile or fixed.

17. The method as recited in claim 12, wherein the one or more radars have a magnetron transmitter, a klystron transmitter or a traveling wave tube transmitter.

18. The method as recited in claim 12, wherein the one or more radars have a microwave frequency selected within the group of microwave frequency bands consisting essentially of W-band (75 to 110 GHz), V-band (50 to 75 GHz), Ka-band (26.5 to 40 GHz), K-band (18 to 26.5 GHz), Ku-band (12 to 18 GHz), X-band (8 to 12 GHz), C-band (4 to 8 GHz), and S-band (2 to 4 GHz).

19. The method as recited in claim 12, further comprising the step of providing one or more additional radars positioned to have the portion of the complex wind flow field or another portion of the complex wind flow field within an additional scanning sector for the additional radars.

20. The method as recited in claim 12, wherein the step of collecting the data from the one or more radars comprise the steps of:
collecting raw data from the one or more radars; and
processing the raw data to generate the data.

21. The method as recited in claim 12, further comprising the step of adjusting the data based on a beam misalignment with a true wind vector.

22. The method as recited in claim 12, wherein the data further comprises a vertical range-height indicator and a horizontal plan-position indicator.

23. The method as recited in claim 12, wherein the data further comprises interpolated horizontal wind flows describing a wake of one or more turbines and a free-stream radial velocity field surrounding the wake.

24. An apparatus for obtaining data to determine one or more characteristics of a complex wind flow field within or adjacent to a wind turbine or array of wind turbines, the method comprising the steps of:
one or more radars positioned to have a portion of the complex wind flow field within or adjacent to a wind turbine or array of wind turbines disposed within a scanning sector of the one or more radars; and
one or more processors that collect data from the one or more radars and determine the one or more characteristics of the portion of the complex wind flow field within or adjacent to a wind turbine or array of wind turbines by analyzing the data, wherein the data comprises at least radial velocity and a spectrum width and the one or more characteristics comprise a plurality of center points and at least one vertical profile of wind speeds for one or more turbine wake(s).

25. The apparatus as recited in claim 24, wherein the one or more characteristics comprise at least two characteristics which further comprise a mean and variable structure of the portion of the complex wind flow field, locating and tracking enhanced turbulence within the portion of the complex wind flow field, a length or width of the one or more turbine wake(s), a set of horizontal wind speed deficits within the portion of the complex wind flow field relative to a free-stream flow, a forecasted power output for one or more turbines within the portion of the complex wind flow field, recognition of a localized event of interest containing changes in wind speed and/or direction, a vertical profile of horizontal wind speeds and directions within the complex wind flow field, a shear across a turbine rotor sweep, a turbine wake deficit from inflow, a turbine wake orientation, a turbine wake evolution, a strength of high speed channels in between two or more turbine wakes, a turbine wake structure, transient wind gusts and lulls, or a combination thereof.

26. The apparatus as recited in claim 24, wherein the one or more radars comprise one or more Doppler radars.

27. The apparatus as recited in claim 24, wherein the one or more radars are mobile or fixed.

28. The apparatus as recited in claim 24, wherein the one or more radars have a magnetron transmitter, a klystron transmitter or a traveling wave tube transmitter.

29. The apparatus as recited in claim 24, wherein the one or more radars have a microwave frequency selected within the group of microwave frequency bands consisting essentially of W-band (75 to 110 GHz), V-band (50 to 75 GHz), Ka-band (26.5 to 40 GHz), K-band (18 to 26.5 GHz), Ku-band (12 to 18 GHz), X-band (8 to 12 GHz), C-band (4 to 8 GHz), and S-band (2 to 4 GHz).

30. The apparatus as recited in claim 24, further comprising one or more additional radars positioned to have the portion of the complex wind flow field or another portion of the complex wind flow field within an additional scanning sector for the additional radars.

31. The apparatus as recited in claim 24, wherein the one or more processors collect the data from the one or more radars by:
collecting raw data from the one or more radars; and
processing the raw data to generate the data.

32. The apparatus as recited in claim 24, wherein the one or more processors adjust the data based on a beam misalignment with a true wind vector.

33. The apparatus as recited in claim 24, wherein the data further comprises a vertical range-height indicator and a horizontal plan-position indicator.

34. The apparatus as recited in claim 24, wherein the data further comprises interpolated horizontal wind flows describing a wake of one or more turbines and a free-stream radial velocity field surrounding the wake.

* * * * *